United States Patent
Nishimura et al.

(10) Patent No.: US 10,621,551 B2
(45) Date of Patent: *Apr. 14, 2020

(54) MANAGING ASSET ASSOCIATED WITH WORK ORDER SECURITY POLICY

(75) Inventors: Yasutaka Nishimura, Yamato (JP); Takashi Ogura, Yamato (JP); Akira Ohkado, Yamato (JP); Tadashi Tsumura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1328 days.

This patent is subject to a terminal disclaimer.

(21) Appl. No.: 13/565,002

(22) Filed: Aug. 2, 2012

(65) Prior Publication Data

US 2012/0297445 A1 Nov. 22, 2012

Related U.S. Application Data

(63) Continuation of application No. 13/238,404, filed on Sep. 21, 2011.

(30) Foreign Application Priority Data

Sep. 30, 2010 (JP) ................................. 2010-222375

(51) Int. Cl.
*G06Q 10/00* (2012.01)
*G06Q 10/10* (2012.01)
(Continued)

(52) U.S. Cl.
CPC ........... *G06Q 10/103* (2013.01); *G06Q 10/06* (2013.01); *G07C 9/00031* (2013.01); *G07C 9/00134* (2013.01)

(58) Field of Classification Search
CPC .. G06Q 10/103; G06Q 10/06; G07C 9/00031; G07C 9/00134
(Continued)

(56) References Cited

U.S. PATENT DOCUMENTS 8,321,253 B2 * 11/2012 Mitchell et al. ............. 705/7.13
2004/0105006 A1 6/2004 Lazo et al.
(Continued)

FOREIGN PATENT DOCUMENTS

JP H07287688 A 10/1995
JP H10320677 A 12/1998
(Continued)

OTHER PUBLICATIONS

Office Action, dated Jan. 20, 2015, regarding U.S. Appl. No. 13/238,404, 10 pages.
(Continued)

*Primary Examiner* — Patrick McAtee
(74) *Attorney, Agent, or Firm* — Yee & Associates, P.C.

(57) ABSTRACT

A method, system and computer program of managing an access right to at least one asset associated with at least one digital work order, or to at least one element associated with the asset, and provides a system and a computer program for the same. The method includes the steps of: loading a security policy associated with the work order, the asset, or the element; starting to monitor location information of the asset or the element and a moving object, or a elapsed time of the moving object at the location; and issuing an event for managing the asset, the element or the moving object in response to the start of the work order or in response to the fact that the loaded security policy is violated by any of the locations, a change in the location, or the elapsed time at the location obtained by the monitoring.

19 Claims, 9 Drawing Sheets

(51) Int. Cl.
*G06Q 10/06* (2012.01)
*G07C 9/00* (2020.01)

(58) Field of Classification Search
USPC .................................................. 705/50; 726/6
See application file for complete search history.

(56) References Cited

U.S. PATENT DOCUMENTS

| | | |
|---|---|---|
| 2005/0010756 A1 | 1/2005 | Clerc |
| 2007/0182543 A1 | 8/2007 | Luo |
| 2008/0072284 A1 | 3/2008 | Horvitz et al. |
| 2008/0163347 A1* | 7/2008 | Ratcliff et al. ............... 726/6 |
| 2008/0177646 A1 | 7/2008 | Frink |
| 2011/0087891 A1 | 4/2011 | Fries et al. |
| 2011/0119734 A1 | 5/2011 | Crawford |
| 2012/0095797 A1 | 4/2012 | Nishimura et al. |
| 2012/0095926 A1 | 4/2012 | Nishimura et al. |
| 2012/0296685 A1 | 11/2012 | Nishimura et al. |

FOREIGN PATENT DOCUMENTS

| | | |
|---|---|---|
| JP | 2002063323 A | 2/2002 |
| JP | 2003067877 A | 3/2003 |
| JP | 2004038440 A | 2/2004 |
| JP | 2007122435 A | 5/2007 |
| JP | 2008276511 A | 11/2008 |
| JP | 2008547105 A | 12/2008 |
| JP | 2009037573 A | 2/2009 |
| JP | 2009059222 A | 3/2009 |
| JP | 2009217643 A | 9/2009 |
| JP | 2009288609 A | 12/2009 |
| JP | 2010086090 A | 4/2010 |

OTHER PUBLICATIONS

Final Office Action, dated Feb. 11, 2014, regarding U.S. Appl. No. 13/246,044, 14 pages.
USPTO Office Action, U.S. Appl. No. 13/246,044, dated Jun. 17, 2013, 8 pages.
Office Action, dated Jan. 10, 2013, regarding U.S. Appl. No. 13/564,858, 15 pages.
Final Office Action, dated Aug. 9, 2013, regarding U.S. Appl. No. 13/564,858, 16 pages.
Final Office Action, dated Sep. 23, 2015, regarding U.S. Appl. No. 13/238,404, 42 pages.
Office Action, dated May 9, 2016, regarding U.S. Appl. No. 13/238,404, 18 pages.
Office Action, dated Nov. 20, 2015, regarding U.S. Appl. No. 13/238,404, 18 pages.
Final Office Action, dated Nov. 2, 2016, regarding U.S. Appl. No. 13/238,404, 15 pages.
Final Office Action, dated Apr. 21, 2017, regarding U.S. Appl. No. 13/564,858, 6 pages.
Office Action, dated Jun. 5, 2017, regarding U.S. Appl. No. 13/238,404, 19 pages.
Final Office Action, dated Nov. 1, 2017, regarding U.S. Appl. No. 13/238,404, 16 pages.

* cited by examiner

MANAGING ASSET ASSOCIATED WITH WORK ORDER SECURITY POLICY

CROSS-REFERENCE TO RELATED APPLICATION(S)

This application is a continuation of and claims the benefit of priority to U.S. patent application Ser. No. 13/238,404, filed on Sep. 21, 2011 and entitled "Method of Managing Asset Associated with Work Order or Element Associated with Asset, and System and Computer Program for the Same", which claims the benefit of priority to Japanese Patent Application Serial No. 2010-222375, filed on Sep. 30, 2010. The contents of which are hereby incorporated by reference.

BACKGROUND

1. Field

The present invention relates to a method of managing at least one asset associated with at least one digital work order or at least one element associated with the asset, and a system and a computer program for the same.

2. Description of the Related Art

Currently available monitoring systems can track a particular asset or an unauthorized person. An example of the video surveillance system is IB-CCTV (digital recording monitoring system) International Business Machines Corporation (trademark) (hereinafter IBM (trademark)) Smart Surveillance System sold by IBM (trademark). The IB-CCTV mainly consists of a digital recording device and cameras. The digital recording device records an image from the camera as high-quality digital image and allows an image to be retrieved from the recorded image data. Multiple cameras are connectable to the digital recording device, and can be individually set in terms of image quality, speed, and schedule. IB-CCTV can reproduce images in conjunction with IB-ACCESS (building access control system), and thus can achieve high level security monitoring. The IBM (trademark) Smart Surveillance System also enables video analysis.

Assets (e.g., a computer, a computer peripheral device, a lighting device, an air handling unit, and a power generator) are managed and maintained on the basis of a work process. A work order is created based on this work process. Specific works for the management and maintenance are performed on the basis of this work order. The work order is automatically created so that the assets can be managed and maintained at a desired schedule (e.g., every month or every two months) or according to the frequency of use (e.g., every 300 operation hours), or is created by an asset manager when necessary. When the work order is approved through a predetermined work-flow, the work for the work order becomes an authorized work. The executable work is assigned to a worker in consideration of, for example: a date on which the work should be executed; a qualification, a skill, and years of experience of the worker to execute the work; and an amount of work already assigned to the worker. The worker checks the assigned work and registers the start and the completion of the work in a predetermined asset management application, or reports them to an asset management system.

Each asset is managed and maintained in accordance with the procedure standardized by the work order. Even in an emergent case, the asset is maintained by creating a work order for an emergent maintenance. In addition, work orders can be created such that the completion of work for the current work order may trigger start of work for the next work order.

For example, asset management and maintenance are implemented by use of International Business Machines Corporation (trademark) Maximo (trademark) Asset Management (hereinafter referred to as Maximo (trademark)) sold by IBM (trademark). One of functions of Maximo (registered trademark) is asset management.

Patent Literature 1 listed below describes an entrance notification technique using an RFID tag (paragraph [0001]). The invention of Patent Literature 1 includes the following processes (paragraph [0014]). Specifically, an RFID receiver is arranged around an area (monitoring area) such as a danger zone desired to be monitored for entrance detection, and an RFID tag is carried by or attached to a detection target moving object. The RFID tag stores therein: a content of an operation that the RFID receiver is desired to execute when the moving object enters the area (operation content); a condition for determining that the moving object enters the area monitored for the entrance detection (operation execution condition); and data required for the determination as to the condition (determination data). The RFID tag receives electric waves transmitted from the RFID receiver when the moving object approaches and enters the monitored area. The RFID receiver, on the other hand, receives the operation content, the operation execution condition, and the determination data from the RFID tag, determines whether the operation execution condition is satisfied using the determination data, and executes the operation content when the determination result is true.

Using a currently available video surveillance system, it is difficult to confirm that a user, e.g., a worker authorized to enter a management district where an asset is stored is not violating a security policy for the asset or the management district. Thus, there is a demand for a technique for monitoring or inspecting a moving object including the authorized user to confirm that the moving object is not violating the security policy for the asset or the management district

SUMMARY

In the present invention, an asset or an element associated with the asset is subjected to the following: security management associated with a work process; security management associated with the asset or the element; and detection of locations or location changes of the asset or the element and a moving object (e.g., worker) or a staying time of the moving object in a certain location. Thus, the present invention enables catching, inspecting and monitoring security violation involving taking out the asset or the element or the unauthorized access to the asset or the element.

The present invention provides a method of managing an access right to at least one asset associated with at least one digital work order, or to at least one element associated with the asset. The steps in the method are executed by a system. The steps in the method are executed by computer processing. The method includes: at a scheduled start time for a work order to be executed, or in response to reception of a report indicating the start of work for the work order to be executed or a report indicating the completion of work for a preceding work order to the work order to be executed, loading into a memory a security policy associated with the work order to be executed, the asset associated with the work order to be executed, or at least one element associated with the asset, and starting to monitor a location of the asset associated with the work order to be executed, a location of the at least one element associated with the asset, a location of a moving object present around the asset or the element, or a elapsed time for which the moving object stays at the location of the asset or the element; and recording an event for managing the asset, the element or the moving object in response to the start of the work order, or in response to the fact that the loaded security policy is violated by the location, a change in the location, or the elapsed time at the location obtained by the monitoring.

The present invention also provides a computer program that manages an access right to at least one asset associated with at least one digital work order, or to at least one element associated with the asset. The computer program causes a computer to execute the steps in the method.

The present invention also provides a system that manages an access right to at least one asset associated with at least one digital work order, or to at least one element associated with the asset. The system includes a loading unit and a monitoring unit, in which at a scheduled start time for a work order to be executed, or in response to reception of a report indicating the start of work for the work order to be executed or a report indicating the completion of work for a preceding work order to the work order to be executed, the loading unit loads into a memory a security policy associated with the work order to be executed, the asset associated with the work order to be executed, or at least one element associated with the asset, and the monitoring unit starts to monitor a location of the asset associated with the work order to be executed, a location of the at least one element associated with the asset, a location of a moving object present around the asset or the element, or a staying time for which the moving object stays at the location of the asset or the element; and an event generating unit that generate an event for managing the asset, the element or the moving object in response to the start of the work order or in response to the fact that the loaded security policy is violated by the location, a change in the location, or the elapsed time at the location obtained by the monitoring.

The asset and the element can be managed by using the security policy for the asset associated with the work order or the at least one element associated with the asset and by acquiring the location information on the asset or the element and location information on the moving object, e.g., an unspecified number of persons or a worker entity. Specifically, whether the moving object is performing an appropriate operation on the asset or the element can be monitored on the basis of the security policy.

DETAILED DESCRIPTION

Figure 1:
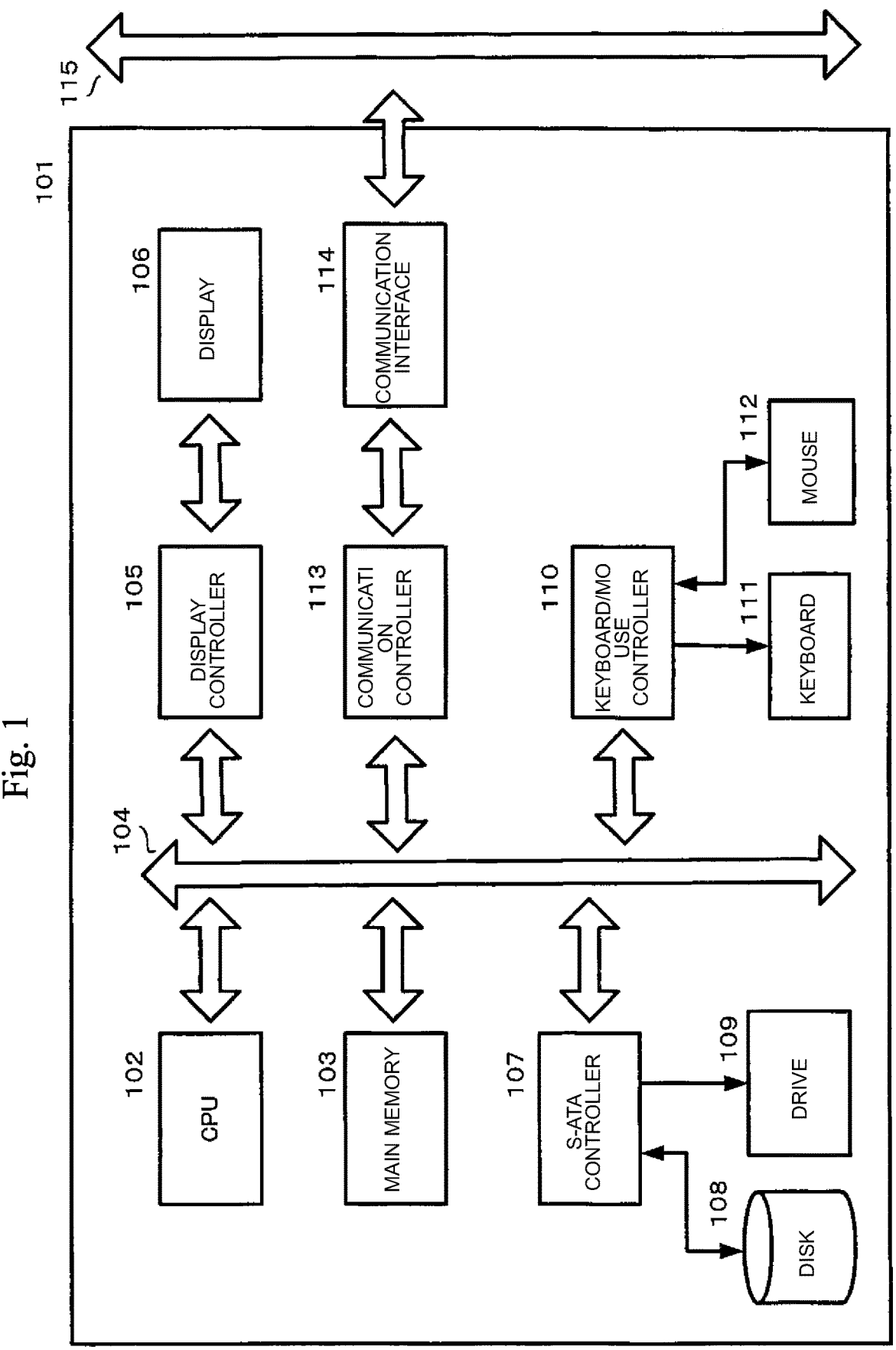
FIG. 1 is a basic block diagram of computer hardware in an embodiment of the present invention.

An embodiment of the present invention is described below with reference to the drawings. In the drawings, the same reference numerals denote the same components unless otherwise specified. It should be understood that the embodiment of the present invention is given for describing a preferable embodiment of the present invention and does not intend to limit the scope of the present invention to what is described herein.

FIG. 1 is a basic block diagram of computer hardware in an embodiment of the present invention.

A computer (101) includes a CPU (102) and a main memory (103) that are connected to a bus (104). The CPU (102) is preferably based on a 32-bit or 64-bit architecture and, for example, the following may be used as the CPU (102): Intel's Core i (trademark) series, Core 2 (trademark) series, Atom (trademark) series, Xeon (registered trademark) series, Pentium (registered trademark) series, and Celeron (registered trademark) series; and AMD's Phenom (trademark) series, Athlon (trademark) series, Turion (trademark) series, and Sempron (trademark) series. A display (106), e.g., a liquid crystal display (LCD), may be connected to the bus (104) via a display controller (105). The display (106) is used to display information on a computer connected to a network through a communication line and software running on the computer with an appropriate graphic interface, for the management of the computer. A disk (108), e.g., a hard disk or a silicon disk, as well as a drive (109), e.g., a CD drive, a DVD drive, or a BD drive may also be connected to the bus (104) via a SATA/IDE controller (107). Furthermore, a keyboard (111) and a mouse (112) may be connected to the bus (104) via a keyboard/mouse controller (110) or a USB bus (not illustrated).

The disk (108) stores an operating system, a program for providing Java (registered trademark) processing environment such as J2EE, a Java (registered trademark) application, and a Java (registered trademark) virtual machine (VM), a Java (registered trademark) JIT compiler, other programs, and data, so as to be loadable onto the main memory (103). The drive (109) is used to install a program from a CD-ROM, a DVD-ROM, or a BD to the disk (108) as required.

A communication interface (114) conforms to an Ethernet (registered trademark) protocol, for example. The communication interface (114) is connected to the bus (104) via a communication controller (113) and plays a role of physically connecting the computer (101) to a communication line (115). Thus, the communication interface (114) provides a network interface layer for a TCP/IP communication protocol of a communication function of the operating system of the computer (101). The communication line may be a wired LAN environment or a wireless LAN environment based on a wireless LAN connection standard such as IEEE802.11a/b/g/n, for example.

Figure 2:
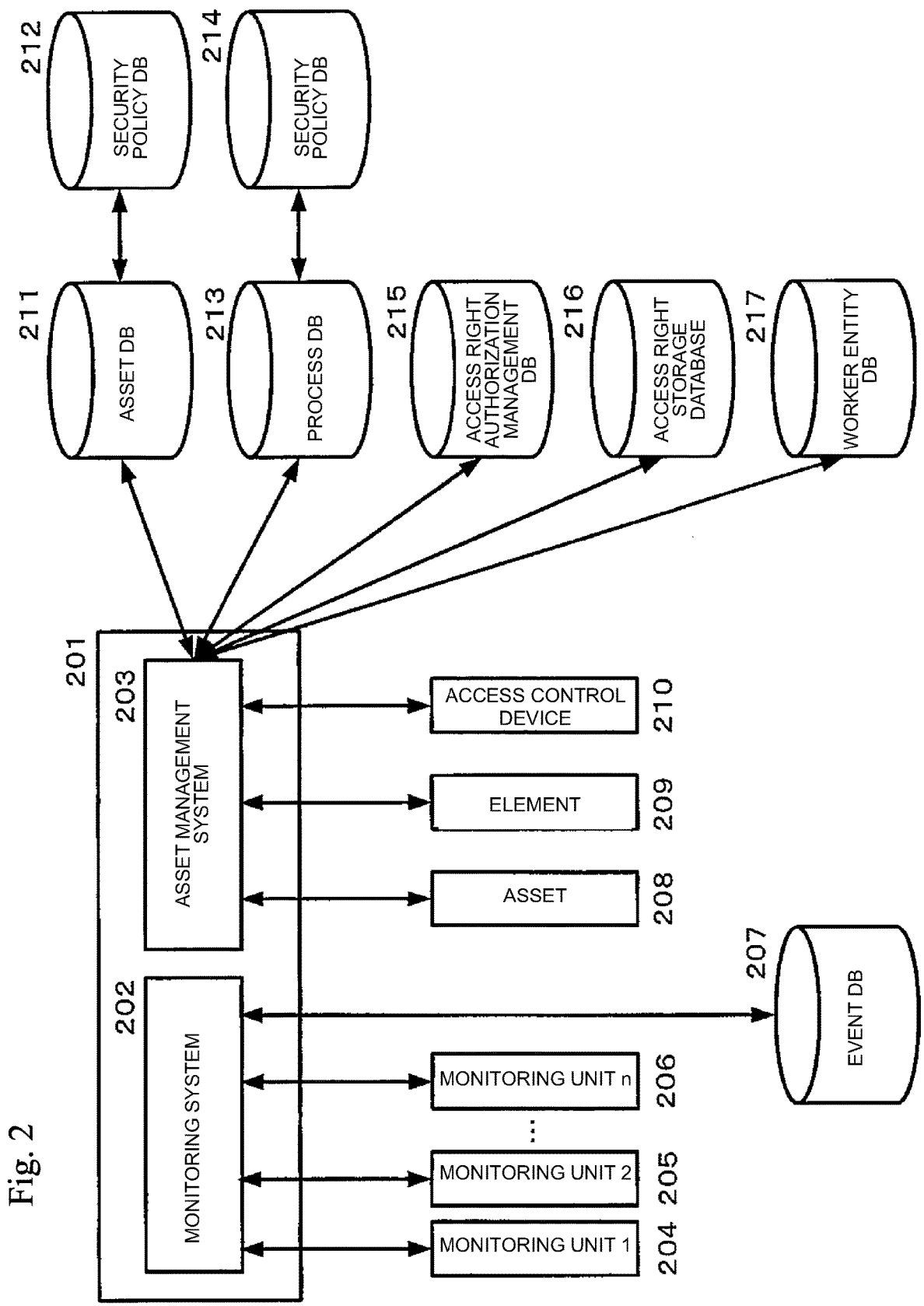
FIG. 2 is a functional block diagram of a system according to the embodiment of the present invention that has a function of the computer hardware shown in FIG. 1.

FIG. 2 is a functional block diagram of a system (201) according to the embodiment of the present invention that has a function of the computer hardware (101) shown in FIG. 1.

The system (201) may be connected to a work terminal (not illustrated) (serving as a user terminal for a worker entity) that may access the system through a wired or wireless network. The network may be either the Internet or a private network. Work-assigned entities (not illustrated) can access the system (201) through the work terminal.

The system (201) may be configured as a single system having two system functions of a monitoring system (202) and an asset management system (203). Alternatively, the system (201) may be configured of at least two independent systems (not illustrated) of the monitoring system (202) and the asset management system (203).

The system (201), especially the monitoring system (202), may be connected to monitoring units 1 to n (n is any natural number) (204 to 206) through wired or wireless network. The network may be either the Internet or a private network.

An appropriate number of the monitoring units 1 to n (204 to 206) determined on the basis of the number of assets and elements to be monitored may be arranged for one or multiple monitoring targets, e.g., in the room or near the entrance. For example, the monitoring units 1 to n (204 to 206) may be arranged at positions enabling the recording of a surveillance range in which an asset or an element can be observed even after movement. The monitoring units may be monitoring videos or monitoring cameras. The monitoring units may also be radio devices, cell phones, RFIDs, or GPS. The monitoring units may make detection using ultrasonic wave, infrared ray, or electric field, for example. The detection with ultrasonic waves is performed by an interpersonal radar. The detection with infrared is performed by temperature sensing. The detection with electrical field is performed by detecting a disturbance of a weak electrical field. Alternatively, if a worker entity is carrying or wearing a radio device such as a personal digital assistant, a laptop PC, a watch or a bracelet having radio function, or a cell phone, the monitoring units may be the base units of the radio device or base stations of the cell phone.

In addition to a full-time running regular video monitoring with the monitoring units 1 to n (204 to 206), the monitoring system (202) may collect data for locating or identifying an asset, an element, or a moving object at a start of a work order.

The monitoring system (202) may receive the data used for locating the asset, the element, or the moving object from the monitoring units 1 to n (204 to 206). The location of the moving object is a location of the moving object present around the asset or the element. The location of the moving object present around the asset or the element may or may not be included in the range that may be monitored by the monitoring units 1 to n (204 to 206). The monitoring system (202) may collect the data in real time. Alternatively, the monitoring system (202) may collect the data periodically (e.g., every minute) or more frequently (e.g., every 30 seconds) than the regular basis (e.g., every minute) after the work is started. On the basis of the data from the monitoring units 1 to n (204 to 206), the monitoring system (202) can obtain the location change of the asset, the element, or the moving object, or an elapsed time thereof at a certain location. An appropriate technique known to a person skilled in the art may be used for obtaining the location, location change, or the elapsed time at a certain position.

The monitoring system (202) receives the data for identifying the asset, the element, or the moving object from the monitoring units 1 to n (204 to 206). The monitoring system (202) may collect the data in real time. Alternatively, the monitoring system (202) may collect the data periodically (e.g., every minute) or more frequently (e.g., every 30 seconds) than the regular basis (e.g., every minute) after the work is started. On the basis of the data from the monitoring units 1 to n (204 to 206), the monitoring system (202) can recognize the asset, the element, or the moving object. An appropriate technique known to a person skilled in the art may be used for recognizing the location, location change, or the elapsed time at a certain position. For example, a moving object may be recognized by identifying the moving object by performing facial recognition on image data acquired from the monitoring. An appropriate technique known to a person skilled in the art may be used for the facial recognition.

The monitoring system (202) detects a violation of a security policy for the asset, element, or the moving object on the basis of the security policy. The monitoring system (202) may check the level of the security policy violation upon detecting the security policy violation. The monitoring system (202) may generate an event associated with the security policy violation or the security policy violation level. The monitoring system (202) may read the event from an event database (207) that may be connected thereto through a network or directly connected thereto by a cable.

The event database (207) may store an event for managing an asset, element, and/or a moving object upon start of the work order. For example, the event is for making the monitoring units 1 to n (204 to 206) focus on a worker. The event database (207) stores therein, a security policy violation and an event associated with the violation, or the security policy violation level and an event associated with the violation level. The security policy violation or the security policy violation level may change depending on the asset, element, moving object, or a work order. The monitoring system (202) may be capable of sending an event associated with the location information on the basis of a work order. Thus, the monitoring system (202) may generate an event in which information for inspecting the work order or creating the evidence of the security violation can be collected. For example, the monitoring videos or the monitoring cameras (204 to 206) transmit to the monitoring system (202) the location information on each of the device as a work subject and a moving object (e.g., worker entity) that are designated in the work order. For efficient inspection, the monitoring system (202) reads, edits, and cuts out the recorded content before the security policy violation from the recorded content of the monitoring videos or the monitoring cameras (204 to 206). In the editing, for example, the image of the asset or the element in the cut out content may be zoomed in. The monitoring system (202) can notify a work manager of the edited content by event notification system such as e-mail. The work manager can promptly audit the security policy with reference to the edited content.

For example, the event is as follows.

A. Event Classification in System (1) For Monitoring Video or Monitoring Camera

For tracking a moving object violating a security policy, the monitoring system (202) sends the monitoring videos or monitoring cameras (204 to 206) an instruction to operate zooming-in, panning, or viewpoint adjustment.

The monitoring system (202) records the image of the worker entity violating the security policy, thereby recording the evidence footage of the violation of the security policy.

The monitoring system (202) may automatically edit the image from the monitoring units into the evidence footage.

(2) For Door Access Control

The monitoring system (202) requests the asset management system (203) to lock the door of the access and control device (210) so that the worker violating the security policy cannot exit the room.

(3) For Work Manager

The monitoring system (202) notifies a work manager of the presence of the worker entity violating the security policy by sending a text message to a cell phone owned by the work manager for example.

B. Event Classification Based on Security policy Level (1) For Obvious Security Policy Violation Obvious security policy violation is entering the area to which the access is unauthorized, approaching the asset or the element to which the access is unauthorized, and moving the asset or element that must not be taken out. In such a case, the monitoring system (202) may alert the work manger or the worker that has made the violation. Alternatively, the monitoring system (202) may request the security guard to be dispatched to the location of the security policy violation or contact the police in such a case.

(2) For Possible Security Policy Violation

Possible security policy violation is, for example, staying near the asset or the element to which the access is unauthorized for a long period of time. In such a case, the monitoring system (202) may cause the monitoring units (204 to 206) to operate zooming-in, panning, or viewpoint adjustment on the target to obtain a detailed image of the image recording range.

(3) Based on Number of Security Violation

The security policy level may be changed on the basis of the number of security policy violations. For example, a single violation is level 1, two violations are level 2, and three violations are level 3. The monitoring system (202) increases the alarm level as the level becomes higher, for example. For example, the monitoring system (202) notifies the security policy violation by voice in level 1, reports the security policy violation by sending a message to the work manager in addition to the voice notification in level 2, and locks the entrance/exit in addition to the voice notification and the message transmission in level 3.

The occurrence of multiple security policy violations in a single time period may be regarded as a high level significant security violation.

(4) Based on Type of Security Violation

The security level may be variable on the basis of the type of security violation. For example, staying within a predetermined location of an asset or an element for not less than a predetermined period is level 1, unauthorized entrance to a predetermined location of an asset or an element is level 2, and taking out an asset or an element is level 3. The monitoring system (202) generates an event in accordance with the level as described in (3).

In view of the asset and work management, the system (201), especially the asset management system (203) may be configured as a single asset management system, such as Maximo (registered trademark), which manages assets while managing the work for maintaining the assets. Alternatively, the asset management system (203) may be configured of at least two individual systems (not illustrated) consisting of a system for managing assets and a system for managing a work for maintaining the assets.

Furthermore, the asset management system (203) may be a system including: a configuration management system having the function of the asset management system; and a configuration management database (CMDB) (see, FIG. 4 below). The CMDB may be provided in the configuration management system or may be connected to the configuration management system through the network (hereinafter, the term "configuration management system" includes the CMDB). The configuration management system may be connected to the asset management system instead of having the function of the system mentioned above. The system (201) as the configuration management system may manage an asset, an element, and/or an access control device as a configuration item which is stored in the CMDB.

The asset management system (203) may manage assets (208), elements (209), and/or access control device (210) using, for example, an asset management database (211) or a CMDB (406).

The asset management system (203) may be connected through a wired or a wireless network, to the asset (208), at least one element (209) associated with the asset (208), and at least one access control device (210) associated with an access path to the asset (208) or the element (209).

The assets (208) are tangible objects and are so-called hardware materials. The assets (208) may be managed by the asset management system (203) such as Maximo (registered trademark), for example. It is impossible to list all the assets (208). For example, the assets (208) include: vehicles such as an airplane, a train, and an automobile; industrial equipment such as a generator, a water purifier, a pump, and a robot; and IT equipment such as a server, a computer, and a printer. Each of the assets (208) as a hardware material connectable to the network may be connected to the asset management system (203) through the network. The asset (208) does not necessarily have to be connected to the asset management system (203). For example, the asset (208) may be connected to the asset management system (203) through a computer (not illustrated) associated with the asset (208). The asset (208) may be accessible by a security device associated with a worker entity.

The asset (208) may be associated with a reader/writer (not illustrated) for reading the security device and writing data, e.g., a token, to the security device. The writer function is optional. The reader/writer may be provided to the asset (208) or may be provided in a shelf or the like in which the asset (208) is provided or stored.

The asset (208) may be associated with the element (209) and/or the access control device (210).

In the embodiment of the present invention, the element (209) is a material or a tool associated with the asset (208), or a material or a tool for managing and maintaining the asset (208). For example, in Maximo (registered trademark), an expendable object is referred to as the material and an object that can be repeatedly used is referred to as the tool. When being connectable to the network, the element (209) may be connected to the asset management system (203) through the network. The element (209) does not necessarily have to be connected to the asset management system (203) and may be connected to the asset management system (203) through a computer (not illustrated) associated with the element (209). The element (209) may be accessible by the security device associated with the worker entity.

The element (209) may be associated with a reader/writer (not illustrated). The writer function is optional. The reader/writer may be provided to the element (209) or provided in a shelf or the like in which the element (209) is stored The element (209) may be associated with at least one access control device (210) associated with an access path to the element (209).

In the embodiment of the present invention, the at least one access control device (210) associated with the access path to the asset (208) or the element (209) is, for example, an access control mechanism provided on a path (route) through which the asset (208) or the element (209) is accessed. The access control mechanism is, for example, a doorway to a room in which the asset (208) or the element (209) is stored or arranged, a doorway to a floor on which the room is present, a doorway to a building including the floor, or a doorway to a site including the building. When being connectable to the network, the access control device (210) may be connected to the asset management system (203) through the network. The access control device (210) may be unlockable by the security device associated with the moving object.

In the embodiment of the present invention, the moving object is a person or a robot. The person or the robot may be a person or a robot (hereinafter, also referred to as worker entity) that executes work on the basis of a work order and may also include an unspecified number of persons or robots. The unspecified number of persons or robots includes a person or a robot not designated in the work order.

For example, a case where the unspecified number of persons or robots that are not the worker are involved with a security policy of the work is as follows. The entrance of an unspecified number of persons or robots may be prohibited in a certain area when a work is executed therein. For example, the entrance of an unspecified number of persons or robots is prohibited in the following case. After a cabinet storing therein confidential information is unlocked, a work needs to be executed for a certain period of time thereat. The entrance of an unspecified number of persons or robots may be prohibited even when the worker entity allows the entrance of a person or a robot unrelated to the work (e.g., tailgating). In this case, not only the worker entity but also the unspecified number of persons may be the monitoring targets in the security policy.

The worker entity is also called an operator in Maximo (registered trademark). The person may be a work manager, for example. The robot may be an autonomously operating robot, for example. When the robot does not operate autonomously, the security in the route through which the order is given to the robot should be secured so that the robot only performs the explicitly ordered work. When the security in the route through which the order is given to the robot is secured, the assignment of the work may substantially be accompanied with the authorization of the access right. The worker entity is associated with, for example, information (hereinafter, also referred to as information associated with a worker entity) such as a worker entity ID, a relevant section or a company name, an employee classification, a qualification, a skill, an empirical value, and a work assigned condition.

The worker entity may carry the security device around with himself/herself, the security device including, for example, an IC card (may be of contact type or non-contact type), a memory device (e.g., a USB memory), a cell phone, a personal digital assistant (PDA), a watch type security device, and a bracelet type security device. The security device may be provided with a memory for storing therein an access token used for authorizing the access right to the asset (208), the element (209), or the access control device (210).

When the security device is an IC card or a memory device, the asset management system (203) can add or delete an access token to or from the IC card or the memory device by using a reader/writer (hereinafter, referred to as reader/writer) for the IC card or the memory device. Thus, it is not indispensable that the IC card itself and the memory device be capable of communicating with the work terminal in such a case. When the security device is a cell phone or a PDA, for example, the cell phone or the PDA may be capable of communicating with the work terminal through wireless communication, e.g., communication using Bluetooth and WiFi, for example.

When a central server sets the access rights, the cell phone or the PDA may be used only for the authentication for the work terminal, the asset (208), the element (209), or the access control device (210) and the security device is not updated.

The security device may be used for the authentication for the access to the asset (208) or the element (209). The security device may be used for the authentication for the access to the access control device (210) (mainly entering). Specifically, the security device may be used for unlocking the door for entrance or exit. The security device may be set so that the door can be unlocked, on condition that the access token is stored therein. The security device may be used as a user authentication device for the worker entity to log into the asset management system (203) through the work terminal. Thus, the worker entity may use the security device to access the asset (208), the element (209), and/or the access control device (210), and/or for user authentication by the asset management system (203).

The security device may also be used for reporting the start or completion of work for a work order. The reporting may be done by the worker entity through logging into the asset management system (203) from the work terminal by use of the security device and through selecting the started or completed work by use of a mouse and the like.

The asset (208) may be associated with a reader/writer for reading the security device and writing data, e.g., a token, to the security device. The writer function is optional. The reader/writer may be provided to the asset (208) or may be provided in a shelf or the like in which the asset (208) is provided or stored.

The element (209) may be associated with a reader/writer. The writer function is optional. The reader/writer may be provided to the element (209) or provided in a shelf or the like in which the element (209) is stored.

The access control device (210) is associated with a reader/writer. The writer function is optional. The reader/writer may be provided to the access control device (210) or provided on a wall or the like near a location in which the access control device (210) is provided.

The work terminal may be associated with a reader/writer (not illustrated). The writer function is optional. The reader/writer may be provided to the work terminal or provided on a desk or the like on which the work terminal is provided.

The asset management system (203) may be connected through the network or directly by a cable to various databases. The various databases may include an asset database (211), a process database (213), an access right authorization management database (215), an access right storage database (216), and a worker entity database (217).

The asset database (211) may be connected to the asset management system (203) through the network, for example. The asset database (211) may be connected to a security policy database (hereinafter, also referred to as a first security policy DB) (212) through the network for example. The asset database (211) may also have the function of the first security policy DB (212)

The asset database (211) may store therein information on asset, information on element, information on access control device, information on association between asset and element, information on association between asset and access control device, and/or information on association between element and access control device.

The information on asset is, for example, a location of each asset (e.g., a room, a floor, a building, an address, a zip-code, and a country). The information on asset may also be a name, a serial number, a managing section, a manager, a seller, a manufacturer, an installation date, a quantity, a purchase or unit price, an updating cost, and a scheduled depreciation date.

The information on element may be such information as a name, a serial number, a storage place (a room number, a floor, a building, an address, a zip-code, and a country), a managing section, a manager, a seller, a manufacturer, an installation date, a stock (quantity), a purchase or unit price, and an expiration date of use, for example.

The information on access control device may be such information as a name, a serial number, a storage place (a room number, a floor, a building, an address, a zip-code, and a country), a managing section, a manager, a seller, a manufacturer, an installation date, a stock (quantity), a purchase or unit price, and an expiration date of use, for example.

The information on association between asset and element is, for example, information in which the element required for maintaining the asset is associated with the asset.

The information on association between asset and access control device is, for example, information in which the access control device required for an access path to the asset is associated with the asset.

The information on association between element and access control device is, for example, information in which the element is associated with the access control device required for an access path to the element.

The first security policy DB (212) stores therein a security policy associated with an asset or an element. The security policy includes a security policy on the location of an asset and a security policy on the location of an element associated with the asset for example. The security policy regarding the location includes a limitation on movable distance of the asset or the element from the stored location thereof, unauthorized entrance to the location at which the asset or the element is stored, time period during which the worker can stay at the location at which the asset or the element is stored.

Specific examples of security policies associated with an asset or element are given below.

Example 1: Backup Device (ID=# ABC) (Asset)

An access unauthorized worker must not remove a hard disk from a backup device (ID=# ABC). The access unauthorized worker must not install a hard disk to the backup device (ID=# ABC). The backup device (ID=# ABC) must not be moved.

Example 2: Hard Disk (Element) (ID=#123) Associated with Backup Device (Asset)

An access unauthorized worker must not move (take out) a hard disk (ID=#123). A rack A in which the hard disk (ID=#123) is stored is managed by locking. The hard disk (ID=#123) must not be moved outside an area A. Moving locations of an access authorized worker and the hard disk (ID=#123) need to match for the movement of the hard disk (ID=#123).

Example 3: Rack A (ID=# A) (Element) Storing Hard Disk (ID=#123) Associated with Backup Device (Asset)

After opening a rack (ID=# A), a worker stays in an area within 30 cm from the rack for not less than 30 seconds.

The process database (213) is connected to the asset management system (203) through the network, for example. The process database (213) may be connected to a security policy database (hereinafter referred to as a second security policy DB) (214) through the network. Alternatively, the process database (213) may also have the function of the second security policy DB (214).

The process database (213) may store therein a work process or a work order created on the basis of the work process.

In the embodiment of the present invention, the work process is a predetermined work procedure for business. The work process may or may not comply with IT Infrastructure Library (hereinafter, referred to as ITIL). For example, the work process does not generally comply with ITIL in an asset management for a generator, pump, or the like. The work process may comply with ITIL when the system (201) includes the configuration management system and the configuration management database (CMDB). When the asset management system (203) is the configuration management system, the work process includes a work for incident management. The incident is roughly divided into a service request and a failure.

The service request is a general and simple request. Various service requests are conceivable in various industries. For example, in the IT industry the service request includes forgetting a service user ID for using an IT infrastructure, shortage of supplies such as toner or paper in a printer, and an inquiry on how to operate an application.

The failure is a trouble state in general. Various failures are conceivable in various industries. For example, the failure in the IT industry includes a failure of the IT infrastructure, a malfunction of an application, computer virus infection, and a state in which the use of IT service is hindered because the IT service is not the one desired for the business service.

The work process includes a business process. The business process may be defined as a flow for achieving a certain goal, including tasks and attributes (a person, a tool, a material, a cost, a service, and the like) for performing the tasks. For example, the business process includes the following flow: (1) a work manager approves a work process; (2) a worker entity executes one or more tasks in the approved work process; (3) the worker entity reports the completion of the task; and (4) the work manager inspects the completed task.

Specific examples of the work process are listed below. The present invention is not limited thereto and may include any work process for business.

1. Work Process for Service Request (Security and System Maintenance)

(1) A backup system performs weekly backup on a tape every Sunday.

(2) A person in charge of the backup collects the tape on Monday morning.

(3) The person in charge of the backup sets a next backup tape in the backup system.

(4) The backup system and/or the room including the backup system (i.e., access control door) cannot be accessed at any time except for the time for the above processing.

2. Work Process for Business Process (Security)

(1) An employee of a security company loads a container on a transportation vehicle for transporting valuable goods (cash, precious metals, a stock certificate, and the like).

(2) The employee of the security company sends the transportation vehicle to a destination for receiving the valuable goods.

(3) When the employee of the security company arrives at the destination, a person in charge of managing the valuable goods opens a door on an entrance path to a safe.

(4) The employee of the security company puts the valuable goods in the container.

(5) The person in charge of managing the valuable goods closes the door to the safe.

(6) The employee of the security company loads the container on the transportation vehicle.

(7) The employee of the security company transports the container to a destination.

3. Work Process for Service Request (Safety)

(1) An operator stops incinerator operation.

(2) After the operation is stopped, a security staff checks that the temperature in the incinerator is not higher than a predetermined value and the oxygen level in the incinerator is not lower than a predetermined value.

(3) After the checking, a cleaning staff starts cleaning the incinerator.

(4) The operator restarts the incinerator operation.

4. Work Process for Failure (RAID Failure)

(1) A RAID management system notifies a manager of an occurrence of a failure in RAID hard disks.

(2) The manager replaces a hard disk in which the failure occurs.

(3) The manager backs up data in the RAID hard disks in external hard disks as required.

5. Work Process for Failure (Virus Infection)

(1) A virus detection system notifies a system administrator of computer virus invasion.

(2) The system administrator isolates the personal computer infected with the computer virus from a network.

(3) The system administrator gets rid of the computer virus or erases the content of the hard disk to be replaced with backup data.

The work order may be in a digital format, stored in a storage device (108) and loaded into the memory (103). The work order may be a single work order. Alternatively, a single work order may include a single or multiple other work orders depending on a scale of the work. Furthermore, the included work order may further include a single or multiple work orders. Thus, a single work order may have a structure that may include one or multiple work orders in a tiered manner. Generally, when a work order includes multiple work orders, the sequence of the work orders is specified. The sequence may be either (1) a sequence which is a procedure in which the work is done, or (2) a sequence which is a predetermined order in performing works specified in the work process and thus observation of which is required. (1) The sequence which is a procedure in which the work is done is a kind of procedure such as removing a cover and then accessing a device inside. Thus, in this example, the work cannot be done without observing the procedure. In contrast, (2) the sequence which is the predetermined order in performing works specified in the work process and thus observation of which is required is exemplified in the following case. When cleaning an incinerator (described in B below), a cleaning staff can start cleaning the incinerator without a safety staff checking the oxygen level. However, the work process indispensably requires the sequence to be observed for the safety of the cleaning staff.

A minimum unit of a work order may be referred to as a task. Since the task is a type of the work order, the "task" is not excluded when the term "work order" is referred to in the embodiment of the present invention.

The work order may include information on: an asset required for the work; an element required for the work on the asset; the number of workers; a scheduled work start date and a scheduled work completion date, or a work period; and a work manager.

The work order may be created by the asset management system (203) on the basis of the work process. The asset management system (203) as the configuration management system may issue the work order on the basis of a change management process used in the configuration management system. Alternatively, the work order may be created on the basis of a release management process that releases the change approved by the change management process in ITIL version 2 (ITIL V2).

The work order is associated with information such as the asset as a work subject, tier information on the work order, a place of the work order in the sequence, target dates and times of work start and completion, a work location, a work ordering section, a work managing section, and an item of account.

The second security policy DB (214) stores therein a security policy associated with a work process. The second security policy is required for each work order and includes a security policy given to the asset and or the element during work and a security policy for a worker accessible to the asset or the element during work. The second security policy may be given to an element other than those designated in the work order. The condition given to the element other than those designated in the work order is, for example, a condition that, during work, only a worker can enter a work place where moving objects (e.g., unspecified number of persons) are normally allowed to enter.

The second security policy is applied in response to a change in the security policy for the asset (208) under application or implementation of a business process. When the security policy for the asset (208) is changed, the condition for authorizing or unauthorizing an access of a particular moving object to the asset (208), for example, is changed or is given to the particular moving object on the basis of the second security policy. For example, it is assumed that works A, B, and C are in a work order and the works B and C are executed after the work A is completed. Here, the security policy is determined depending on which of the works B and C is executed first after the work A is completed. For example, the work A is "prepare backup device", the work B is "backup server B", and the work C is "backup server C". The security level is assumed to be set higher for the server C than the server B. Thus, since the security policies differ between the work B and the work C, the security policy to be activated is determined depending on which of the works B and C is performed after the worker reports the completion of the work A to the system (201).

For example, specific examples of the security policies associated with a work order are listed below.

Example 1: Security Policy for Work Order P

An asset that is not the work subject must not be approached equal to or closer than 30 cm for equal to or more than 30 seconds. An access to the backup device (ID=#

ABC) is authorized. The hard disk (ID=#123) associated with the backup device (ID=# ABC) must not be taken out.

Example 2: Security Policies for More than Two Work Orders in Single Work Process The access path (route) of the worker may differ depending on which of the area A and the area B the hard disk should be brought to in the succeeding work order to the work order for taking out the hard disk. For example, let's assume a case where the worker entity moves to the area A and the area B through different routes, and where an important asset may not be on the route to the area A but may be on the route to the area B. In such a case, security policy for protecting the asset or an element on the paths may differ. More specifically, the security policy for the route to the area A, which has no important asset, is set to be low, while the security policy for the route to the area B, which has an important asset, is set to be high.

The access right authorization management database (215) may be connected to the asset management database (203) through the network. The access right authorization management database (215) stores therein information for managing whether a worker entity is allowed to access the asset (208), the element (209), or the access control device (210).

The access right storing database (216) may be connected to the asset management system (203) through the network, for example. The access right management database (216) stores therein information for managing the access right to the asset (208), the element (209), or the access control device (210) associated with the work order.

The worker entity database (217) may be connected to the asset management system (203) through the network, for example. The worker entity database (217) stores therein information on a schedule, an already assigned work amount, and a transfer route of the worker, as well as a qualification (national qualification, official position, and the like), a skill, and years of experience of the worker.

Figure 3:
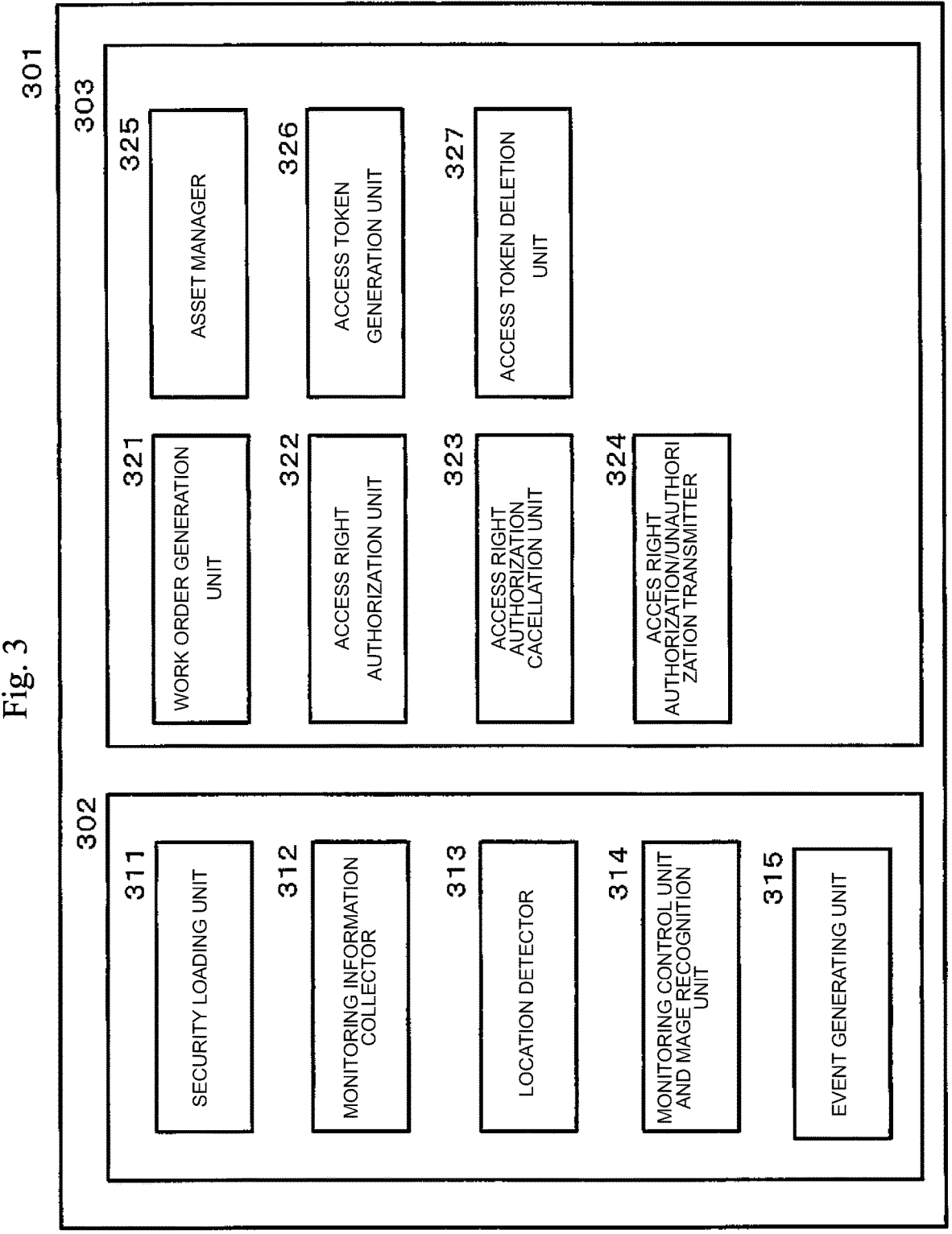
FIG. 3 is a functional block diagram of the system shown in FIG. 2.

FIG. 3 is a functional block diagram of the system (201) shown in FIG. 2.

This system (301) corresponds to the system (201) in FIG. 2. The system (301) has two systems (or functions) of a monitoring system (302) and an asset management system (303).

The monitoring system (302) includes a security loading unit (311), a monitoring information collector (312), a location detector (313), a monitoring unit control/image recognition unit (314), and an event generating unit (315).

The security loading unit (311) loads a security policy associated with a work order to be executed from the security policy database (212) connected to the asset database (211), for example. The security loading unit (311) loads from the security policy database (214) connected to the process database (213) a security policy associated with any one of the asset (208) associated with the work order to be executed and at least one element (209) associated with the asset. The security loading unit (311) loads security policies defined for the worker entity assigned the work order to be executed from the security policy database (212), for example.

The security loading unit (311) loads the security policies from the databases at a scheduled start time for the work order to be executed or in response to the reception of a report indicating the start of work for the work order to be executed or a report indicating the completion of work for a preceding work order to the work order to be executed.

The monitoring information collector (312) collects through the monitoring units 1 to n (204 to 206) data for monitoring: locations of the asset associated with the work order to be executed or at least one element associated with the asset and a worker entity assigned to the work order to be executed; the change in the locations; or the elapsed time of the worker entity at the location. The monitoring information collector (312) transmits the collected data to the monitoring unit control/image recognition unit (314).

The location detector (313) locates the asset, element, and/or the worker entity on the basis of the data from the monitoring information collector (312). A technique for measuring a location of a person or an object may be used for the location detection means. For example, a location detection engine known to a person skilled in the art may be used for the location detection means. The location detector may employ location detection using radio waves, for example, including Cell-ID method, time difference of arrival (TDOA) method, and received signal strength indication (RSSI) method. The location detector (313) detects the movement of the asset, element, or the worker entity. The location detector (313) detects the elapsed time of the worker entity at a certain location.

The monitoring unit control unit and image recognition unit (314) has the functions of a monitoring unit control unit and an image recognition unit. The monitoring unit control unit and the image recognition unit may be installed as separate units. Specifically, the monitoring unit control unit (314) controls the monitoring units 1 to n (204 to 206) on the basis of the data from the monitoring information collector (312). A control means known to a person skilled in the art may be used for the control. For example, a monitoring video or a monitoring camera may be operated zooming-in, panning, or viewpoint adjustment on the asset, element, or the moving object. Specifically, the image recognition unit (314) identifies the asset, the element, or the moving object. An identification means known to a person skilled in the art may be used for the identification. For example, the monitoring video or the monitoring camera may be capable of performing face or object recognition. The monitoring unit control and image recognition unit (314) stop or interrupt the monitoring by the monitoring video or the monitoring camera at a scheduled completion time in the work order or in response to reception of a report indicating the completion of work for the work order already started or a report indicating the start of work for a succeeding work order to the work order already started.

The event generating unit (315) may read from the event database (207) and generate an event for managing an asset, an element, or a moving object at the start of the work order. The event generating unit (315) may read from the event database (207) and generate an event for managing an asset, an element, or a moving object when the location, the location change, or the elapsed time of the moving object at the location obtained by the location detector (313) violates the security policy. The event generating unit (315) notifies the work manager of the security policy violation in response to the violation of the security policy. The event may differ depending on the level or the type of the security policy violation. The event may differ depending on the work order, the asset (208), the element (209), or the moving object.

The asset management system (303) includes an order generation unit (321), an access right authorization unit (322), an access right authorization cancellation unit (323), an access right authorization/unauthorization transmitter (324), an asset manager (325), an access token generation unit (326), and an access token deletion unit (327).

The work order generation unit (321) creates at least one work order on the basis of a work process stored in the process database (213). The work order generation unit (321) may store the generated work order in the process database (213) or a work order database (not illustrated) as a written work order.

The access right authorization unit (322) authorizes the worker entity associated with a work order to be executed to have the access right to the asset (208), the element (209), or the access control device (210) associated with the work order to be executed. The worker entity is authorized at a scheduled start time for the work order to be executed, or in response to reception of a report (or a report message) indicating the start of work for the work order to be executed or a report (or a report message) indicating the completion of work for a preceding work order to the work order to be executed. The access right authorization unit (322) searches, for example, the process database (213) or the CMDB ((406) in FIG. 4) for the work order. The access right authorization unit (322) searches, for example, the worker entity database (217) or the CMDB (406) for a worker entity that may be assigned to the work order. The access right authorization unit (322) identifies the access right to the asset (208), the element (209), or the access control device (210) associated with the work order to be executed and assigns the identified access right to the worker entity. The access right is identified and assigned at a scheduled start time for a work order to be executed, or in response to reception of a report (or a report message) indicating the start of work for the work order to be executed or a report (or a report message) indicating the completion of work for a preceding work order to the work order to be executed.

The access right authorization unit (322) may associate the access right to the asset (208), the element (209), or the access control device (210) with the work order. The access right authorization unit (304) reads the access right to the asset (208), the element (209), or the access control device (210) associated with the work order, from the access right storage database (216), for example.

The access right authorization unit (322) authorizes the access right to the asset (208), the element (209), or the access control device (210). The authorization includes provision of an access right to at least one of the asset (208), the element (209), or the access control device (210). For example, when there are as assets a generator and a pump, the access rights cannot be set for the generator and the pump. In this case, it is necessary to authorize the access right to the access control device such as a door associated with an access path to the generator. On the other hand, when there is as an asset an IT system, the access right to the IT system can be authorized directly. In this case, only the access right to the IT system should be managed and the authorization of the access right to the element (209) and/or the access control device (210) associated with the IT system might not be required.

The access right authorization cancellation unit (323) cancels or invalidates the access right to at least one access control device (210) associated with the access to the asset associated with the started work order or the element associated with the asset, or locks the access control device (210).

The access right authorization cancellation unit (323) cancels the access right authorized by the access right authorization unit (322) at a scheduled completion time for a work order already started, or in response to reception of a report (or a report message) indicating the completion of work for the work order already started or a report (or a report message) indicating the start of work for a succeeding work order to the work order already started. The start of work for a succeeding work order to the work order already started is a start of work scheduled to be performed after the already started work.

The access right authorization/unauthorization transmitter (324) transmits the access right authorization message from the access right authorization unit (322) to the asset (208), the element (209), or the access control device (210). The access right authorization/unauthorization transmitter (324) transmits the access right unauthorization message from the access right authorization cancellation unit (323) to the asset (208), the element (209), or the access control device (210). The function of the access right authorization/unauthorization transmitter (324) to transmit the access right authorization message from the access right authorization unit (322) to the asset (208), the element (209), or the access control device (210) may be provided to the access right authorization unit (322). The function of the access right authorization/unauthorization transmitter (324) to transmit the access right unauthorization message from the access right authorization cancellation unit (323) to the asset (208), the element (209), or the access control device (210) may be provided to the access right authorization cancellation unit (324). The access right authorization/unauthorization transmitter (324) deletes an authorization from the access right authorization management database (215) that manages whether the worker entity is to be authorized to access the asset (208), the element (209), or the access control device (210).

The asset manager (325) searches the asset database (211) or the CMDB (406) to find and identify the element (209), or the access control device (210) associated with the asset (208) designated in the work order.

The access token generation unit (326) generates an access token used for authorizing an access to the asset (208), the element (209), or the access control device (210) in association with the work order to be executed. The access token may be generated for each work order or each task which is the minimum unit of the work order. The access token generation unit (326) transmits the generated access token to the security device carried around with the worker entity authorized the access. A function (access token transmitter) other than the access token generation unit (326) may transmit the access token.

The access token deletion unit (327) deletes or invalidates the access token associated with a work order to be completed or a completed work order from the security device, at a scheduled completion time for the work order already started, or in response to reception of a report (or a report message) indicating the completion of work for the work order already started or a report (or a report message) indicating the start of work for a succeeding work order to the work order already started. The access token is deleted or invalidated, for example, by the access token deletion unit (327) by transmitting a message indicating deletion or invalidation of the access token in the security device.

When the access right to the asset (208), the element (209), or the access control device (210) is managed online by the asset management system (203), the following processes of (1) and (2) may be performed using the units described above.

(1) The access right authorization unit (322) is inquired of whether the worker entity is authorized to access the asset (208), the element (209), or the access control device (210)

from the asset, the element, or the access control device. When the worker entity is authorized to access the asset (208), the element (209), or the access control device (210), the access right authorization unit (322) transmits a message indicating authorization of the worker entity to have the access right to the asset (208), the element (209), or the access control device (210) that has made the inquiry. When the access right to the asset (208), the element (209), or the access control device (210) is managed online, the access right authorization cancellation unit (323) transmits a message indicating cancellation of the authorization of the worker entity to have the access right to the asset, the element, or the access control device (210) that has made the inquiry, at a scheduled completion time for a work order already started, or in response to reception of a report indicating the completion of work for the work order or a report indicating the start of work for a succeeding work order to the work order already started. When the access right to the asset (208), the element (209), or the access control device (210) is managed online, the access right authorization cancellation unit (323) deletes the authorization of access right from the access right authorization management database (215) managing whether the worker entity is authorized to access the asset (208), the element (209), or the access control device (210).

(2) The access right authorization unit (322) authorizes the worker entity to have the access right to the asset (208), the element (209), or the access control device (210). Upon authorization of the access right, the access right authorization/unauthorization transmitter (324) transmits a message indicating authorization of the worker entity to have the access right, to the asset (208), the element (209), or the access control device (210). The asset (208), the element (209), or the access control device (210) to which the authorization message is transmitted authorizes the authorized worker entity to have the access right thereto. The access right authorization cancellation unit (323) cancels the authorization of the access right for the worker entity, at the scheduled completion time of the work order or in response to reception of the report indicating the completion of work for the work order. The access right authorization/unauthorization transmitter (324) transmits a message indicating cancellation of the authorization of the access right, to the asset (208), the element (209), or the access control device (210) for which the access right has been authorized. The asset (208), the element (209), or the access control device (210) to which the cancelling message has been transmitted cancels the access right of the authorized worker entity.

Figure 4:
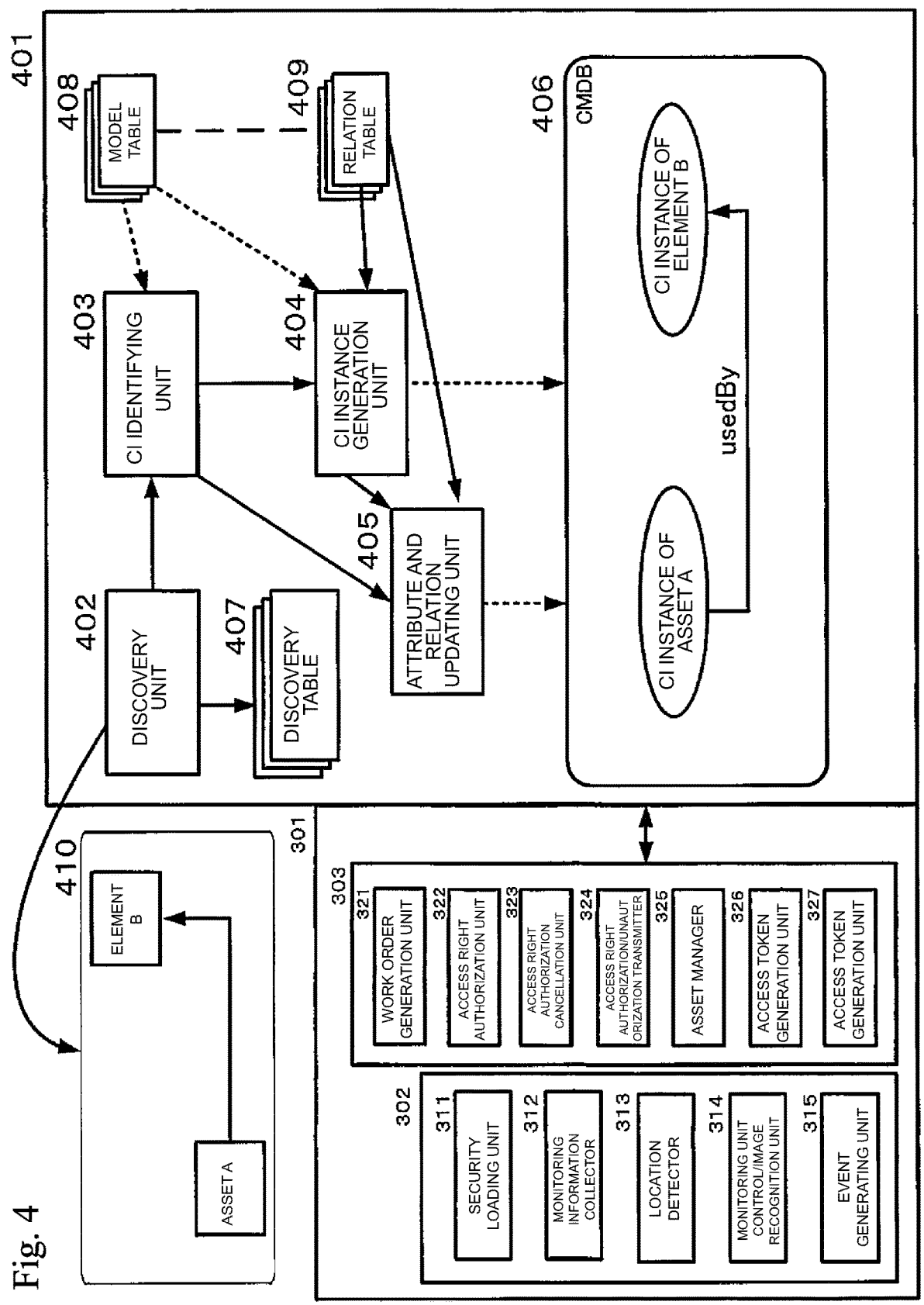
FIG. 4 is a functional block diagram of the system shown in FIG. 2, in a case where the system includes a configuration management system and a configuration management database.

FIG. 4 is a block diagram of the system (201) shown in FIG. 2, in a case where the system (201) is a configuration management system.

First, basic terms related to the configuration management system and the configuration management database (CMDB) are described below.

Configuration management is a process of: recognizing configuration items (hereinafter, also referred to as CIs) to be managed in IT service management; and maintaining, updating, checking, and auditing information on the configuration items.

CI is a basic unit of a management target in the IT service management. In the embodiment of the present invention, the CI includes the asset (208), the element (209), and/or the access control device (210). In the embodiment of the present invention, the CI may include a moving object (especially the worker).

The configuration management database (CMDB) stores therein each CI's at least one predetermined attribute and a relation with another CI. The CMDB is a core of the configuration management in the ITIL framework. The CMDB, which is conceptually a database, may physically take a form of a database system or a spreadsheet provided by spreadsheet software. The use of the CMDB allows a configuration process manager to readily understand the relation between the CIs.

The configuration item instance (CI instance) is data corresponding to a CI. Each CI instance is represented as a data model instance in the CMDB. A static data instance and a Java (registered trademark) class instance are examples of the instance. An implemented Java (registered trademark) class instance is stored in the CMDB with, for example, a mechanism called Java (registered trademark) Data Objects (JDO) for persistently storing the Java (registered trademark) class instance in a hard disk. Thus, turning off the computer does not erase the generated Java (registered trademark) class instance. When the computer is restarted, the Java (registered trademark) class instance is read from a storage device, e.g., the hard disk, and loaded on a main memory as a Java (registered trademark) class instance variable or deletable with a Java (registered trademark) program. In the following, the description may be given on the assumption that the CI is implemented in the CMDB as an instance.

The data model is a schema for defining the CI and is an information model providing a consistent definition of managed CIs and a relation therebetween. Specifically, the data model defines a predetermined attribute of a CI and a relation between the CI and another CI. "CDM" which is a data model for configuration management database proposed by IBM, is an example of the data model. CDM is implemented based on Unified Modeling Language (UML), for example.

Attributes identify and describe each CI for the management of CIs. Although not limited thereto, the attributes include the following: a CI name (the name of the CI, e.g., a server or a client); a product number (ID) (the number for uniquely identifying an entity to which the CI belongs, e.g., a manufacturing number, a serial number, or the like); a category (classification of the CI, e.g., an asset, an element, or an access control device); a type (further detailed description of the CI classified by the category); a model number (the CI's model number given by the provider); a warranty period (a warranty period set by the supplier of the CI); a version number (the CI's version number); a location (a location at which the CI is present, e.g., installation place, a shelf, storage); a responsible owner (the name of a person responsible for managing the CI); a responsibility start date (a date on which the responsible owner became responsible for the CI); a provider (a developer or a source of the CI); a provided date (a date on which the CI is provided for an organization); an acceptance date (a date on which the CI is accepted by the organization); a utilization start date (a date on which the CI is started to be used); a CI status (a current status, e.g., operating, tested, or failed, or a future status, e.g., a scheduled status of the CI); and a CI instance status (validity or invalidity of CI instance). Attributes required in the IT service management will be defined afterwards when necessary.

A relation represents the relation between CIs Like the CI, the relation may be defined by the data model. Examples of the relation include assigns, canConnect, canUse, connectAt, connects, controls, deployedOn, Located, Managed, Owned, provides, runAt, uses, and usedBy. Relations required in the IT service management will be defined afterwards when necessary.

The functional block diagram of the system shown in FIG. 4 is described below.

Like the system (301) of FIG. 3, the system (401) may include the security loading unit (311), the monitoring information collector (312), the location detector (313), the monitoring unit control/image recognition unit (314), the event generating unit (315), the work order generator (321), the access right authorization unit (322), the access right authorization cancellation unit (323), the access right authorization/unauthorization transmitter (324), the asset manager (325), the access token generation unit (326), and the access token deletion unit (327). The system (401) may be connected to the system (301) of FIG. 3, or the monitoring system (302) and the asset management system (303) of FIG. 3.

The system (401) as a configuration system may include a discovery unit (402). Still, in the embodiment of the present invention, the CI may be managed manually by a manager of the configuration system even when the system (401) does not include the discovery unit (402). The system (401) includes a CI identifying unit (403), a CI instance generation unit (404), an attribute and relation updating unit (405), and the CMDB (406). The discovery unit (402), the CI identifying unit (403), the CI instance generation unit (404), the attribute and relation updating unit (405), and the CMDB (406) may be implemented in a system in a single computer or implemented in a distributed system in multiple computers. The system (401) further includes a discovery table (407), a model table (408), and a relation table (409). The tables may be implemented in a storage system in a single device or implemented in a distributed storage system in multiple devices, in multiple computers. The system (401) is connected to a display device which displays a console screen (410) of a Tivoli Application Dependency Discovery Manager (hereinafter, abbreviated as TADDM), for example. The console screen (410) shows a connection relation between a CI (an asset A) and a CI (an element B). The connection relation between the CI (asset A) and the CI (element B) shown in the console screen (410) is an example and does not represent all the CIs and connection relations between the CIs managed by the system (401).

The discovery unit (402) detects (or "discovers" in another expression) information related to CIs managed by the CMDB (406). The system (401) may include multiple discovery units (402). Preferably, a management target is connected to the system (401) through a network. The network may be in wired or wireless connection. A manager of the system (401) may set the detection target as desired. The detection range may be set by a domain name, an IP address, a MAC address, a device identifier, a database name, or a combination of these. When a CI as the management target is industrial equipment, information on the industrial equipment is detected. The detected information may be information on a new CI, or an updated value of an attribute or a relation of an existing CI. The new CI is a CI detected by the discovery unit (402) but not registered in the CMDB (406). The existing CI is a CI of which the instance is already registered in the CMDB (406). The discovery unit (402) detects the information on the CI on the basis of discovery information (e.g., A-Discovery) (503 in FIG. 5) stored in the discovery table (407). Which discovery information should be used is designated by a discovery method in a data model (501 in FIG. 5). The discovery unit (402) passes the detected information on the CI onto the CI identifying unit (403).

The CI identifying unit (403) receives the information on the CI from the discovery unit (402) and processes the detection result. The CI identifying unit (403) determines whether the information on the CI is information on a new CI or an updated attribute or relation value of an existing CI with reference to the CMDB (406). The determination may be performed, for example, by checking the information on CI against the CI instant names stored in the CMDB (406). When the information on the CI is information on a new CI, the CI identifying unit (403) passes the information onto the CI instance generation unit (404). On the other hand, when the information on the CI is an updated attribute and relation value of an existing CI, the CI identifying unit (403) passes the information onto the attribute and relation updating unit (405).

The CI instance generation unit (404) generates one data set indicating a predetermined attribute of the CI and a relation between the CI and another CI on the basis of the information on the CI and in accordance with the data model (501 in FIG. 5) stored in the model table (408) and a relation table (504 in FIG. 5) stored in the relation table (409). The one data set is instantiated on the basis of the information on the CI detected by the discovery unit (402) or manually inputted information on the CI. The one data set may be implemented with a static data instance or a Java (registered trademark) class instance. An example of the one data set is a CI instance (502 in FIG. 5). The one data set is stored in the CMDB (406). The one data set may have an attribute and a relation in the CI instance (see 502), or have an attribute in the CI instance but be stored as a relation instance separately in the CMDB (406). In the latter case, the CI instance has a linking for identifying the relevant relation instance.

The attribute and relation updating unit (405) cooperates with the discovery unit (402) for implementing tracking. The attribute and relation updating unit (405) reflects an updated attribute or relation value of a CI on a CI instance of the CI stored in the CMDB (406), i.e., updates the attribute or relation value of the CI instance of the CI. The update is performed by replacing the value with the information on the CI detected by the discovery unit (402). In the replacement, all the values of the attributes and the relations of the CI instance may be replaced by the information detected by the discovery unit (402) or only different values different from those in the information may be replaced.

The CMDB (406) records the CI instance (502) of the CI.

Figure 5:
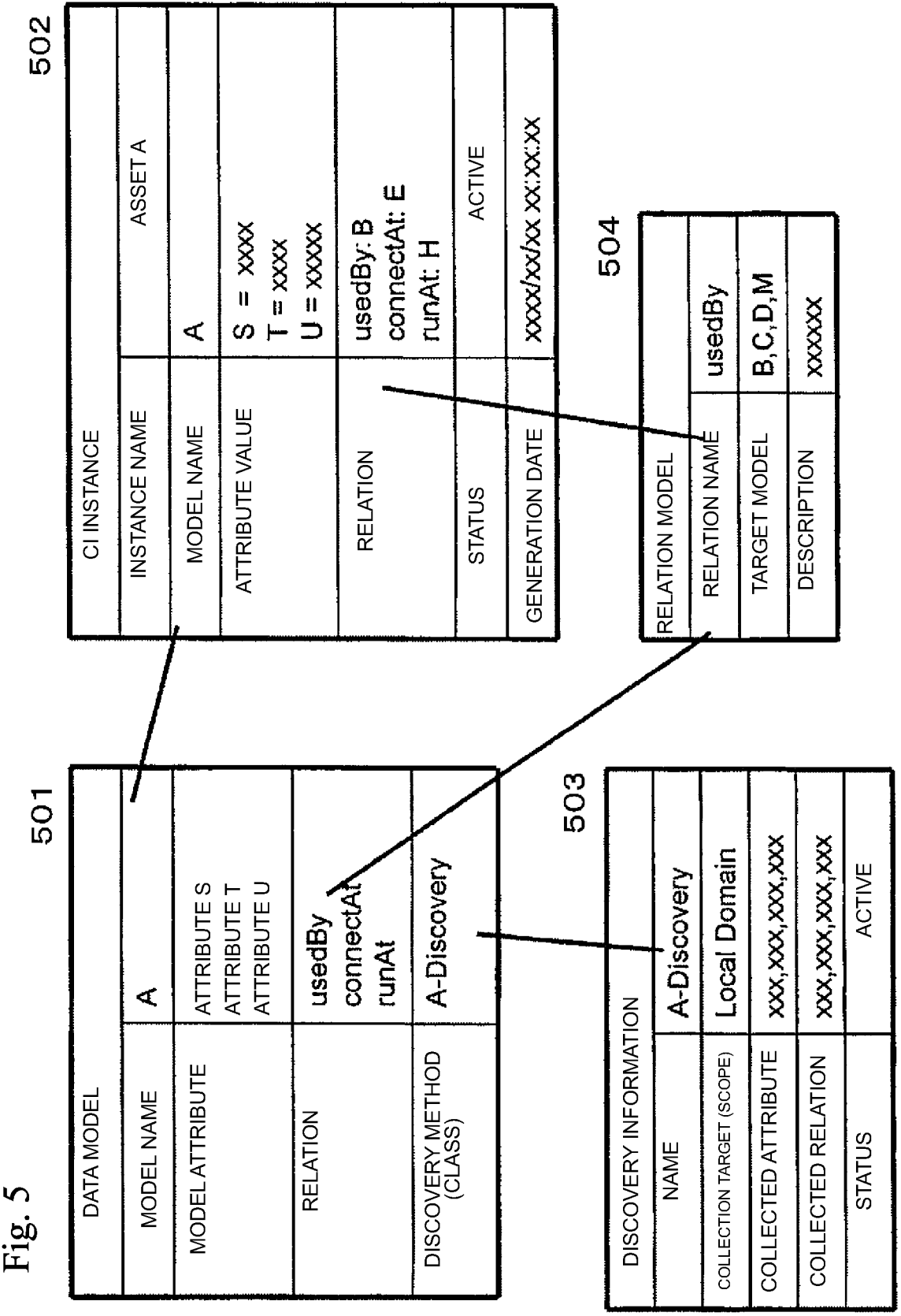
FIG. 5 shows a data model, a configuration item (CI) instance, discovery information, and a relation model used in the system in FIG. 4.

The discovery table (407) stores therein discovery information (503 in FIG. 5). The discovery unit (402) uses the discovery information (503) for detecting information on a CI. The discovery information (503) may be implemented with a static data instance or a Java (registered trademark) class instance, for example. The discovery information (503) is also called a discovery policy. The discovery information (503) includes a collection target (scope) which is a range searched by the discovery unit (402), i.e., a range of search for a CI, a collected attribute, and a collected relation. The collection target may be specified using, for example, a subnet IP address, a range of an IP address, an individual IP address, a MAC address, a device identifier, a hostname, a database name, or a combination of these. As another mode, the collection target may be a schedule management database (not illustrated) connected to the system (401) through the network. The schedule management database stores therein, for example, data related to process management using a device. As still another mode, the collection target may be a database (not illustrated) storing therein a batch process definition file. When the collection target is the database storing therein a batch process definition file, the discovery unit (402) performs detection by loading the content of the batch process definition file. The batch process definition file stores therein data indicating a sequence in which the devices are to be used, for example.

The model table (408) stores therein the data model (501 of FIG. 5). The CI instance generation unit (404) uses the data model (501) for generating one data set indicating a predetermined attribute of the CI and the relation between the CI and another CI.

The relation table (409) stores therein a relation model (504 in FIG. 5). The CI instance generation unit (404) uses the relation model (504) for generating one data set indicating a predetermined attribute of the CI and the relation between the CI and another CI.

FIG. 4 shows a case where the discovery unit (402) detects information on an asset and an element as management targets, the asset and the element being connected to the system (401) through the network. As a result, the discovery unit (402) detects information on the asset A and the element B associated with the asset A. Then, the CI identifying unit (403) determines whether the information is information on a new CI with reference to the CMDB (406). Based on the determination result, the CI instance generation unit (404) generates CI instances of the asset A and the element B as well as an instance of the relation (usedBy) between the asset A and the element B. Then, the instances are stored in the CMDB (406).

FIG. 5 shows the data model (501) stored in the model table (408), the CI instance (502) (of the asset A) stored in the CMDB (406), the discovery information (503) stored in the discovery table (407), and the relation model (504) stored in the relation table (409) that are used in the system (401) in FIG. 4.

The data model (501) is a schema for defining a CI. For example, the data model (501) includes a "model name" specifying a CI, a "model attribute" indicating an attribute of the CI specified by the model name, a "relation" that may hold true between the CI specified by the model name and another CI, and a "discovery method" for identifying the discovery information for detecting the CI specified by the model name. The "model attribute" is specified in accordance with the attribute specified in the data model "CDM" for the configuration database proposed by IBM, for example, but is not limited thereto. A manager of the CMDB (406) may specify desired attributes in the data model (501) at his/her discretion. The "relation" is specified in accordance with the relation specified in the CDM, for example, but is not limited thereto. The "discovery method" may be specified by the discovery information name, which is A-Discovery in FIG. 5.

The discovery information (503) includes descriptions of: a "name" of the discovery information specified by the "discovery method"; a "collection target (scope)" of a management target (CI) to be collected by the discovery unit (402); a "collected attribute" and a "collected relation" of management target (CI) to be collected by the discovery unit (402); and a "status" indicating that the discovery information is active or inactive.

The CI instance (502) includes descriptions of: an "instance name" for identifying a CI to which the instance belongs; a "model name" indicating the data model used to generate the instance; an "attribute value" of an attribute specified by the data model; a description (value) of a "relation" specified by the data model; a "status" indicating that the instance is active or inactive; and a "generation date" of the CI instance. Preferably, the CI instance further includes a CI instance identifier unique to each CI instance. The CI instance identifier, which may be of any kind as long as the CI instance can be distinguished from other CIs therewith, for example, a hostname, a serial number, or a combination of other attributes which are of certain values may be used. The CI instance (502) indicates that: the CI instance is a CI instance of a device A; the CI instance is instantiated using the data model A; the CI instance has attributes S, T, and U which individually have values; as a relation, the device A is used by B (usedBy: B), connected to E (connectAt: E), and runs on H (runAt: H); and the CI instance is active, as well as the date on which the CI instance is generated.

The relation model (504) is a schema for defining a relation specified by the data model (501). The relation model (504) includes descriptions of a "relation name" such as usedBy, a "target data model" for specifying the target data model for the relation, and an "explanation" of the relation.

Figure 6:
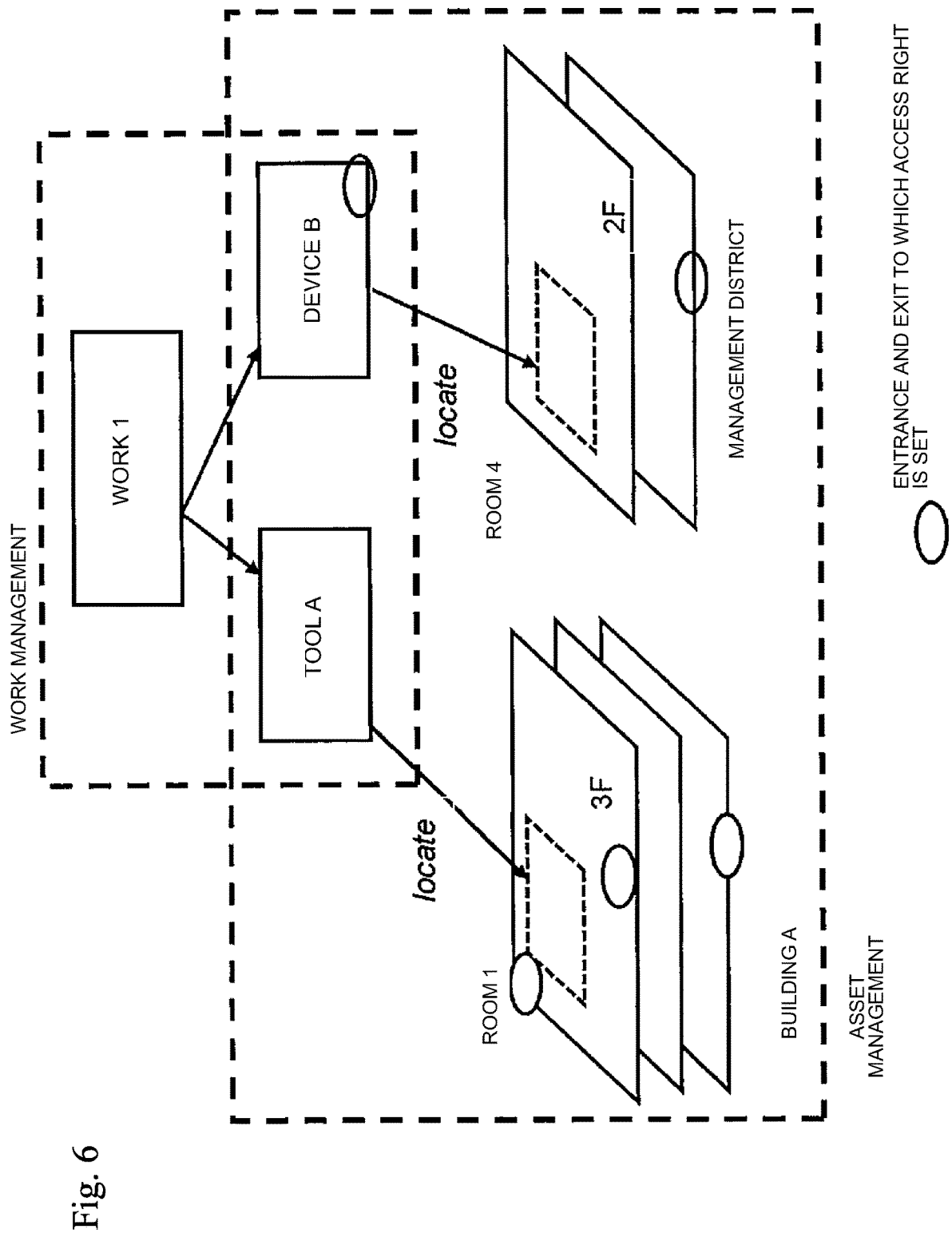
FIG. 6 shows management subjects of the asset management systems shown in FIGS. 2 to 4.

FIG. 6 shows management subjects of the asset management systems (203 and 303) shown in FIGS. 2 to 4. In the following, the asset management systems (203) and (303) may be simply referred to as the asset management system (203).

The asset management system (203) manages an asset (e.g., a device B) and an element (e.g., a tool A) associated with the asset and the locations thereof. As indicated by an arrow in FIG. 6, the device B is on the second floor in a managed district B. As shown in an arrow in FIG. 6, the tool A associated with the device B is in a room 1 on the third floor of a building A. The tool A is used for maintaining the device B.

The asset management system (203) manages whether an access right is required for operating the asset or the element associated with the asset. Thus, when accessing the asset or the element associated with the asset to which access control is applied, a worker has to be authorized to have the access right thereto.

The asset management system (203) manages which access control in the managed district B and the building A is inaccessible. Thus, when accessing the access control to which the access control is applied, the worker has to be authorized to have the access right thereto.

The asset management system (203) performs work management which is a maintenance work on the asset or the element on the basis of the work process. The asset management system (203) creates one or multiple work orders on the basis of the work process. A work order (Work 1) in FIG. 6 is as follows:

(Work 1) Maintain the device B; use the tool A for maintaining the device B.

Figure 7:
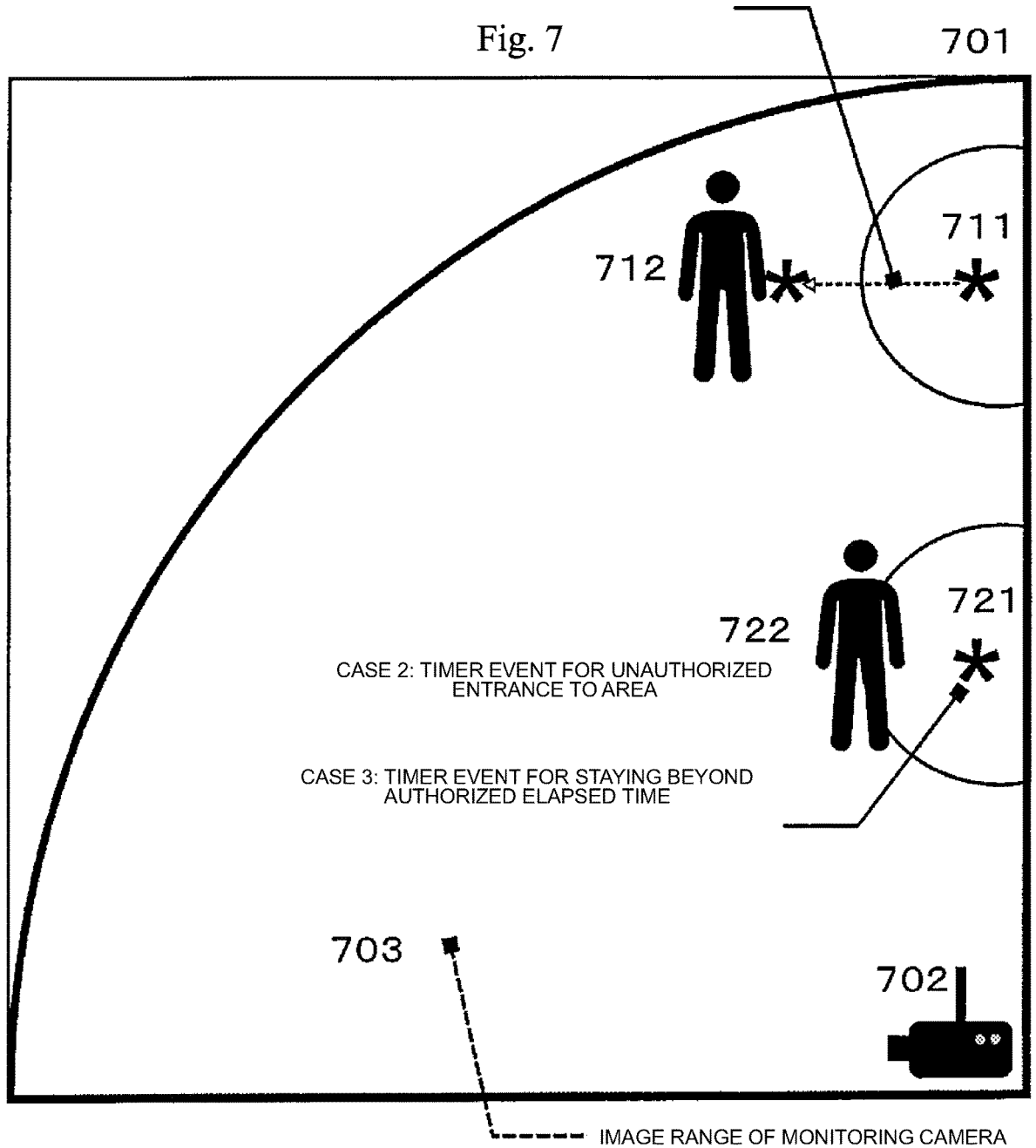
FIG. 7 shows relation between the asset shown in FIG. 2 or the element associated with the asset and assigned entities.

FIG. 7 shows a management target of the monitoring systems (202, 302) shown in FIG. 2 and FIG. 3.

The monitoring system (202) monitors the room (701) as its management target through a monitoring video or a monitoring camera (702). The monitoring video or the monitoring camera (702) is provided to a corner of the ceiling of the room and can monitor the image within an arc (703). The image in the entire room (701) can be monitored by providing multiple monitoring videos or monitoring cameras (702).

An asset (711) and an asset (721) are placed in the room (701).

The following cases 1 to 3 exemplify the determination of the monitoring system (202) of whether the worker complies with the security policy associated with the work order.

(1) Case 1

The security policy of the asset (711) stipulates as a general rule that a moving object must not access the asset (711). The security policy associated with the work order stipulates that the asset (711) can be moved only for two meters from its original location.

Based on the work order, the worker (712) has rights to enter the room (701) and access the asset (711).

On the basis of the work order, the worker (712) starts the maintenance of the asset (711) and enters the room (701). On the basis of the image from the monitoring video or the monitoring camera (702), the monitoring system (202) detects the movement of the asset (711) for more than two meters from its original position. Thus, the monitoring system (202) may detect the security policy violation by the worker (712) and notify the worker (712) or a work manager of the movement of the asset (711) beyond a predetermined position. On the basis of the importance level of the asset (711) for example, the monitoring system (202) may lock the access control device (210) to the room (701) which is the access path associated with the asset (711).

(2) Case 2

A security policy for an asset (721) stipulates as a general rule that the moving object must not access the asset (721). The security policy associated with the work order stipulates that the inspection on the asset (721) is authorized to the worker (712) but not to the worker (722).

On the basis of the work order, the worker entity (722) has the rights to enter the room (701) and perform inspection on the asset (711) but has no rights to perform inspection on the asset (721).

On the basis of the work order, the worker (722) starts the maintenance of the asset (721) and enters the room (701). On the basis of the image from the monitoring video or the monitoring camera (702), the monitoring system (202) detects that the worker (722) enters the area of the asset (721). Thus, the monitoring system (202) may detect the security policy violation by the worker (722) and notify the worker (722) or a work manager of the unauthorized entrance to the area by the worker (722). On the basis of the importance level of the asset (721) for example, the monitoring system (202) may lock the access control device (210) to the room (701) which is the access path associated with the asset (721).

(3) Case 3

A security policy for the asset (721) stipulates as a general rule that a moving object must not approach the location of (near) the asset and that the condition designated in the work order is applied during work. Furthermore, the security policy designated in the work order stipulates that the worker is allowed to stay in the position of (near) the asset only for five minutes or shorter.

On the basis of the work order, the worker (722) has rights to enter the room (701) and perform inspection on the asset (721).

On the basis of the work order, the worker (722) starts the inspection on the asset (721) and enters the room (701). On the basis of the image from the monitoring video or the monitoring camera (702), the monitoring system (202) detects that the worker (722) has stayed at the position of (near) the asset (721) for more than five minutes. Thus, the monitoring system (202) may detect the security policy violation by the worker (722) and notify the worker (722) or a work manager that the worker (722) has stayed at the position for more than five minutes. On the basis of the importance level of the asset (721) for example, the monitoring system (202) may lock the access control device (210) to the room (701) which is the access path associated with the asset (721).

Figure 8:
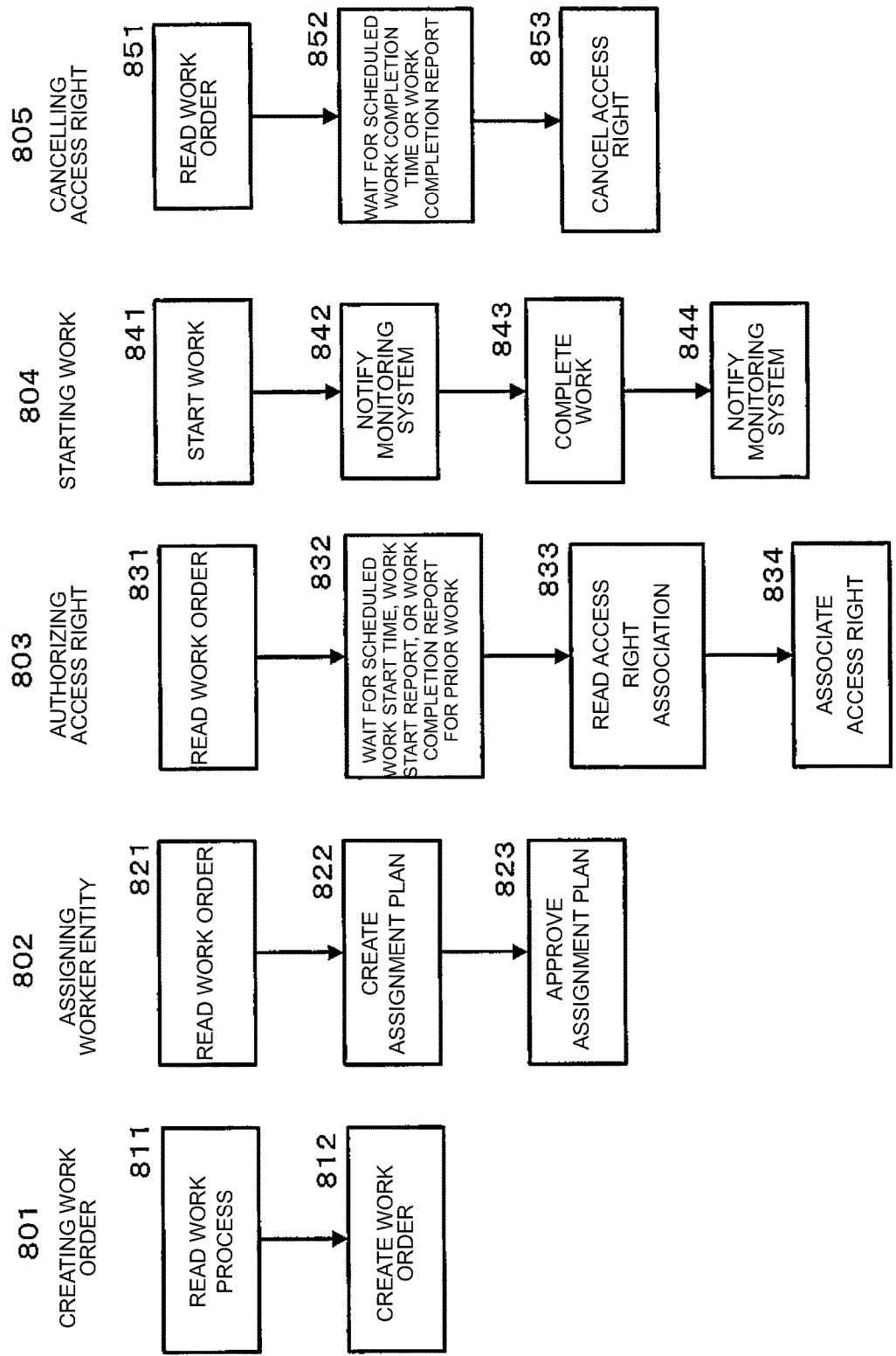
FIG. 8 shows processes for the management of the access right to the asset or the element according to the embodiment of the present invention using the system shown in FIG. 2.

FIG. 8 shows processes for the management of the access right to the asset or the element according to the embodiment of the present invention using the asset management system (203) shown in FIG. 2.

The processes for the management of the embodiment of the present invention includes: issuing a work order (801); assigning worker entity (802); authorizing access right (803); starting work (804); and cancelling access right (805) that are executed in this order.

The steps of creating work order (801) and assigning a worker entity (802) may be performed contiguously or discontiguously in terms of time. When the steps are performed contiguously in terms of time, Steps (801 to 805) are contiguously performed. When the steps are performed discontiguously in terms of time, for example, the work order is issued (801) seven days before the work start deadline, the worker entity is assigned (802) six days before the deadline, the access right is authorized (803) on the work start date, and the access right is cancelled (804) upon completion of the work. When the access right is authorized (803) or the access right is cancelled (804) at a certain time point, the asset management system (203) searches the process database (213) at regular intervals to find a work order of which the scheduled start or completion time has come. When such a work order is found, the asset management system (203) authorizes the access right (803) or cancels the access right (804).

1. Creating Work Order (801)

The work order generation unit (321) of the asset management system (203) reads a work process from the process database (213) (Step 811). On the basis of the work process thus read, the work order generation unit (321) creates a work order (Step 812). Alternatively, the work order may be issued by a person in a section managing the work (hereinafter, also referred to as a work manager) by retrieving the work process (which may or may not be in a digital format) (Step 811), and creating and sending the work order (Step 812). The created work order is inputted to the asset management system (203) to be managed by the asset management system (203).

The work order may be changeable by the work manager after being issued. The work order may be received by the asset management system (203) as an official work order only after the approval of the work manager.

One or multiple work orders are issued depending on the content of the work process.

The work order may be issued two weeks or right before the work is started, or upon reception of a completion message for a prior work. Upon being issued, the work order may be stored in the process database (213) or the work order database (not illustrated) of the asset management system (203). The work order may be delivered to the worker entity in a message format such as an e-mail upon being issued or at a point near the scheduled work start date. The work order may be delivered to the worker entity in a physical format such as a printed matter upon being issued or at a point near the scheduled work start date.

In Maximo (registered trademark), a maintenance procedure is defined depending on the type of an asset, and a tool and the like are specified for the procedure. In Maximo (registered trademark), when the work order is generated, an element and an access control device may be associated with a work order by applying the maintenance procedure.

2. Assigning Worker Entity (802)

The work order is assigned to the worker entity. The work order is assigned to the worker entity by the asset management system (203) or by the work manager by using the asset management system (203).

When the asset management system (203) assigns the work order to the worker entity, the asset management system (203) reads the work order from the process database (213) (Step 821). The asset management system (203) can extract worker entity candidates from the worker entity database (217) on the basis of information associated with work-assigned entities. For example, the asset management system (203) may extract the worker entity candidates on the basis of information on a schedule, an already assigned work amount, and a transport path of the work-assigned entities, as well as a qualification, a skill, and years of experience of the work-assigned entities. Then, the asset management system (203) assigns the worker entity candidates to the work order (Step 822).

When the work manager assigns the worker entity to the work order by using the asset management system (203), the work manager extracts a work process (which may or may not be in a digital format) (Step 821) and assigns the worker entity to the work order (Step 822). The work manager assigning the worker entity to the work order by using the asset management system (203) can make the determination outside the asset management system (203) at his or her discretion. For example, the work manager can assign a worker XX with a worker YY to a work A because the work manager wants the worker XX to be well-experienced with the work A. The work manager inputs the result of the assignment of the worker entity to the work order, to the work order through the asset management system (203).

3. Authorizing Access Right (803)

In the management and the maintenance of the asset based on a work process, the access right needs to be authorized so that only the worker assigned the work order can access the asset as the work subject, the element associated with the asset, and the access control device associated with the asset or the element. The access right is authorized by associating the access right with a subject for which the access right is to be authorized.

The access right authorization unit (322) of the asset management system (203) reads the work order (Step 831) and reads data required for the association of the access right. For example, the data may be: the worker entity; a scheduled work start time; an asset as the work subject, an element associated with the asset, and an access control device associated with the asset or the element; tier information on the work order; or a place, of the work order, in the sequence.

The access right to an asset is a right to operate or dispose of the asset. The access right to an element is a right to operate or dispose of the element. The access right to the access control device is a right to open or close (typically unlock) the access control device.

The asset to be associated with the access right is read from the work order. When the element to be associated with the access right is designated in the work order, the element is read from the work order. When no element to be associated with the access right is designated in the work order, the asset management system (203) may search the asset database (211) or the CMDB (406) for the element or the access control device associated with the asset designated in the work order.

The access control device (210) associated with the asset or the access path to the asset is automatically determined as in the following examples.

(1) The work process is assumed to be a preventative maintenance on an air handling unit (AHU). Thus, the asset is the AHU. The AHU is assumed to be designated in association with work in the work order. The asset management system (203) accesses the process database (213) and determines that the asset is the AHU based on the work order. The asset management system (203) determines that the element is an oxymeter required for inspecting the AHU based on the work order. The asset management system (203) accesses the asset database (211) or the CMDB (406) and determines that the access control devices are a machine room in which the AHU is installed and a warehouse in which the oxymeter is stored. Thus, the asset management system (203) determines that access rights to the machine room and the warehouse are required for the preventative maintenance on the AHU.

(2) The work process is assumed to be a backup operation for a server. Thus, the asset is the server. A tape device is an element, i.e., the element associated with the server. The work order is assumed to designate the server as the asset and the tape device as the element. The work order is assumed to designate the backup operation as the following processes: taking a tape from a tape storage; setting the tape in the tape device; backing up the server on the set tape; and returning the tape to the tape storage upon completion of the backup. The asset management system (203) determines that the asset is the server and the tape is the element on the basis of the work order. The asset management system (203) accesses the asset database (211) or the CMDB (406) and determines that the access control devices are a server room in which the server is installed and the tape storage in which the tape is stored. Thus, the asset management system (203) determines that the access rights to the server room and the tape storage are required for the server backup operation.

The access right is associated at the scheduled work start time of the worker entity, or in response to reception of a report indicating the start of work or a report indicating the completion of prior work (Step 832). When multiple work orders, in particular, are managed in a predetermined sequence, the start of work succeeding work about to start may be triggered by the report indicating the completion of the work about to start. In this case, the report indicating the completion of the work about to start also serves as the report indicating the start of the next work. Thus, the asset management system (203) records the start of the next work upon receiving the report indicating the completion of the work about to start.

The access right authorization/unauthorization transmitter (324) of the asset management system (203) transmits an access token to the security device of the worker entity to be authorized to have the access right to the asset, the element, or the access control device (210) when the access right is authorized as required.

4. Starting Work (804)

The worker for the work reports the start of work to the asset management system (203) through the work terminal and starts the work (Step 841). The asset management system (203) instructs the monitoring system (202) to start the monitoring (Step 842). The monitoring by the monitoring system (202) is described with reference to FIG. 9. Upon completing the work (Step 843), the worker reports the completion of work to the asset management system (203) through the work terminal. The asset management system (203) instructs the monitoring system (202) to complete the monitoring at a scheduled work completion time, or in response to reception of a report indicating the completion of work.

5. Cancelling Access Right (805)

The access right authorization cancellation unit (323) of the asset management system (203) reads the work order (Step 851) and instructs the access right authorization/unauthorization transmitter (324) to transmit an instruction to cancel or invalidate the access token at a scheduled completion time, or in response to reception of a report indicating the completion of work for the work order already started or a report indicating the start of work for a succeeding work order to the work order already started (Step 852). The access right authorization/unauthorization transmitter (324) transmits the instruction to cancel or invalidate the access token to the security device of the worker entity for which the access right is to be cancelled (Step 853) to cancel the access right.

For example, when the access right is cancelled (805) in response to reception of the report indicating the completion of the current work or the report indicating the start of next work, cancelling the access right may be triggered by the following operation. Specifically, the cancelling the access right is triggered when an operator selects a work order for which the completion of the current work or the start of the next work is to be reported and makes the selected report.

When the access control is completely controlled online, instead of transmitting the access token to the security device and storing the access token therein, authorizing the access right (803) may be performed by the following processes.

1. Method Using Central Server

The access control is assumed to be completely controlled online and the asset management system (203) is assumed to inquire a central server for any decision to authorize the access right or not. In this case, after the asset, the element, or the access control device (access target) is identified, the access right to the access target of the security device owned by the worker is dynamically registered in the central server. In response to the inquiry from the asset, the element, or the access control device, the central server determines whether the worker has the access right and returns the determination result to the asset, the element, or the access control device, that has made the inquiry. The asset, the element, or the access control device receiving the result authorizes the access right when the result indicates that the worker has the access right. Then, in response to receiving a report indicating the completion of work from the worker entity, the asset management system (203) transmits an instruction to delete the authorized access right to the central server. Upon receiving the deletion instruction, the central server deletes the access right of the worker who reported the completion of work.

As described above, in the method using the central server, the access right is authorized by inquiring the central server for the determination to authorize the access right or not every time the access is to be made.

2. Method Using Access Target Determination Device

An access target determination device includes the functions of the access right authorization unit (322) and the access right authorization cancellation unit (323) in FIG. 3.

Access control is assumed to be completely controlled online and the access target determination device is assumed to be connected to the asset management system (203) online. In this case, after the access targets are identified, the access target determination device notifies each access target of the change in access policy for the worker (access right is authorized). Upon receiving the work completion report from the worker, the asset management system (203) transmits, to the access target determination device, an instruction to change the access policy for the worker (access right is cancelled). Upon receiving the change instruction, the access target determination device notifies each access target of the change in the access policy for the worker (access right is cancelled).

As described above, in the method of using the access target determination device, the access right is managed as follows. Specifically, the access target determination device notifies each access target of the access right in advance and, for example, the access control device (210) determines whether or not the worker entity has the access right to the access control device (210) on the basis of the access right notified in advance.

In the access right management method according to the present invention, the asset management system (203) authorizes the worker entity to which the work order is assigned to have the access right, at the scheduled work start time described in the work order, or in response to reception of the report indicating the start of work or the completion of prior work. The system (201) cancels the access right in response to reception of a report indicating the completion of work or predetermined time period after the reception of the report indicating the completion of work.

Figure 9:
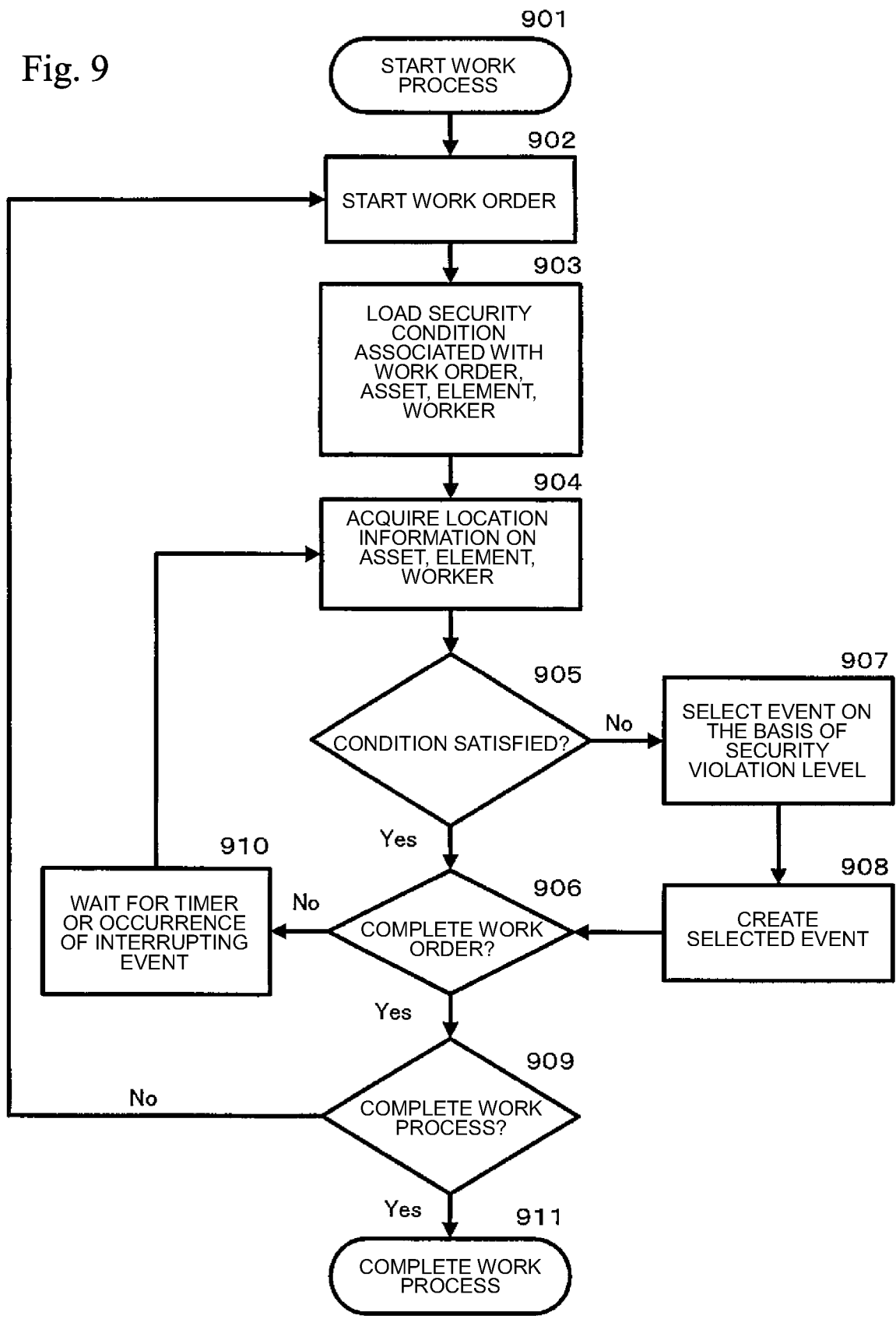
FIG. 9 shows a process for security management for the asset or the element according to the embodiment of the present invention using the system shown in FIG. 2.

FIG. 9 shows a process for security management for the asset or the element according to the embodiment of the present invention using the system shown in FIG. 2.

In Step 901, the asset management system (203) starts a work process and issues a work order on the basis of the work process. The work order may be created by a manager of the work process. In such a case, the asset management system (203) reads out the work process created by the manager of the work process from the process database (213).

In Step 902, the asset management system (203) requests the monitoring system (202) to start recording or performing monitoring for tracking a moving object, at a scheduled work start time of the worker for the work, when the start of work is reported, or after the completion of a prior work is reported.

In response to the reception of the request for the monitoring start in Step 902, the monitoring system (202) loads a security policy associated with any one of the asset and the element or both from the first security policy DB (212) on the basis of the work order in Step 903. On the basis of the work order, the monitoring system (202) loads a security policy associated with any one of the work order and the worker or both from the second security policy DB (214). Then, the monitoring system (202) starts monitoring the asset or the element using the monitoring units (204 to 206).

In Step 904, the monitoring system (202) acquires data related to location information on the asset or the element, and the worker from the monitoring units (204 to 206). The monitoring system (202) detects the locations of the asset or the element, and the worker from the acquired data related to the location information. The monitoring system (202) may detect the locations of the asset or the element, and the worker periodically, e.g., every minute. The monitoring system (202) may detect the locations of the asset or the element, and the worker at a shorter period, e.g., every 30 seconds when the movement of the locations of the asset or the element, and the worker is detected.

In Step 905, the monitoring system (202) monitors whether the location or the movement of the asset, the element, or the worker satisfies the security policy associated with the asset, the element, or the worker. The process proceeds to Step 906 when the security policy is satisfied, whereas the process proceeds to Step 907 when the security policy is unsatisfied.

In Step 906, the monitoring system (202) completes the monitoring in response to the reception of the request to complete the monitoring from the asset management system (203).

In response to a security violation or the level of the security violation, the monitoring system (202) selects an event corresponding to the security violation or the security violation level from the event database (207) in Step 907 as the security policy is unsatisfied.

In Step 908, the monitoring system (202) generates the event selected in Step 907 to a certain target.

In Step 909, the asset management system (203) checks whether the work process to which the work order belongs is to be completed in response to the completion of the work order. The process proceeds to Step 911 when the work process is to be completed, whereas the process returns to Step 902 and waits for the start of next work order at Step 902 when the work process is not to be completed.

In Step 910, the asset management system (203) sets a timer for measuring the elapsed time of the moving object or checks if there is any interrupting event with a work cancel order for example.

In Step 911, the asset management system (203) completes the work order.

An example of hard disk maintenance for a backup device according to the embodiment of the present invention is described below.

A. Example of Hard Disk for Backup Device

1. Creating Work Order

On the basis of the stipulation in "Maintenance process for hard disk of backup device", work order for the maintenance of the hard disk is created periodically (e.g., every week), every predetermined period (e.g., every hundred hours), or when a predetermined amount of data (e.g., 10 G or more) is stored. The work order may be designed to require an approval by a work manager before issuance thereof. In the work order, a target execution date or an execution date and time, or a target execution period (e.g., Sep. 1, 2010 or Sep. 1, 2010 12:00; or Sep. 1, 2010 to Sep. 10, 2010) is designated on the basis of the stipulation in the hard disk maintenance process.

The hard disk maintenance process is assumed to stipulate the following works to be executed in sequence.

Work 1 Obtain replacing hard disk from stock room

Work 2 Remove hard disk to be replaced from backup device

Work 3 Install replacing hard disk in backup device

Work 4 Move replaced hard disk to Stock room

Work 5 Record replaced hard disk, replacing hard disk, replaced date, and worker in system 2. Identifying Asset and Element The work order designates a particular backup device (e.g., ID: 123) as well as a hard disk (e.g., ID: AAA) and a replacing hard disk (e.g., ID: BBB) that are associated with the backup device. On the basis of the work order, the asset management system (203) may recognize the backup device (ID: 123) as the asset and the hard disk associated with the backup device (ID: AAA) as the element.

3. Identifying Access Control Device Associated with Hard Disk

In the hard disk maintenance, access rights to the hard disk (e.g., with ID: AAA) and the hard disk (e.g., with ID: BBB) may be set. However, an access right is preferably set to access paths through which the hard disk (ID: AAA) and the hard disk (ID: BBB) are accessed. Thus, the asset management system (203) extracts an access control device on the access path associated with the backup device (ID: 123) from the asset database (211) for the access to the recognized backup device (ID: 123) in which the hard disk (ID: AAA) is currently installed. Alternatively, the asset management system (203) recognizes the access control device on the access path associated with the backup device (ID: 123) designated in the work order.

The asset management system (203) extracts the following as the access control device associated with the access path to the backup device (ID: 123): a backup device room (e.g., second backup device room on the fifth floor in a building A) in which the backup device (ID: 123) is placed; an office area including the backup device room (e.g., north area on the fifth floor of the building A); and a front gate for entering the building including the office area (e.g., the building A). The asset management system (203) recognizes the doors for managing doors to the backup device room, the office area, and the front gate.

The hard disk maintenance work is assumed to stipulate the replacement of the hard disk (ID: AAA) with the replacing hard disk (ID: BBB). The asset management system (203) recognizes the hard disk (ID: BBB) as well as the hard disk (ID: AAA) as the elements associated with the backup device (ID: 123).

Here, the hard disk (ID: BBB) is assumed to be stored in a stock room for example. In this case, the worker has to enter (access) the stock room for the hard disk maintenance work. Thus, the worker has to have the access right for the access path to the stock room as well as the access right for the access path to the backup device room. For example, when the stock room is in the same office area as the backup device room, the access right to the office area needs not to be redundantly provided and the access right to the stock room is required. For example, when the stock room is not in the same office area as the backup device room, and the entrance thereto is controlled, the worker has to have the access rights to the doors managing the entrance to an office area (e.g., south area on the fifth floor in the building A) including the stock room and the stock room in addition to the access rights to the doors for controlling the entrance to the office area (north area on the fifth floor in the building A) including the backup device room.

4. Assigning Worker Entity to Maintenance Work

For assigning a worker to the maintenance work, several patterns as described below are conceivable.

(1) The asset management system (203) automatically generates a worker assignment plan for the maintenance work in consideration of: a qualification or a skill of a worker; a work schedule of the worker on the day of the maintenance work; whether the worker is scheduled to visit the maintenance work location (the building A or a facility including the building A) on the day of the maintenance work; and the like. By using the asset management system (203), the work manager can modify the generated assignment plan and approve the generated assignment plan or the modified assignment plan.

(2) The work manager assigns the maintenance work to the worker by using the asset management system (203), e.g., an assignment manager function of Maximo (registered trademark). In this pattern, since the work manager assigns the maintenance work to the worker, approval of the assignment plan may be omitted as long as no approval of a higher level manager is required.

(3) An optimum arrangement system that is independent from the asset management system (203) and minimizes the traveling time of the worker automatically generates a worker assignment plan for the maintenance work in consideration of the work locations for other works. By using the asset management system (203), the work manager can modify the generated assignment plan and approve the generated assignment plan or the modified assignment plan. Although the optimum arrangement system is not a subject matter of the present invention, a person skilled in the art can appropriately select the optimum arrangement system usable in the embodiment of the present invention.

(4) The work manager assigns the maintenance operation to the worker without using the asset management system (203) and inputs the assignment result to the asset management system (203).

As described in the patterns (1) to (4), assigning the worker for the maintenance work secures the worker required for the maintenance work and thus, a scheduled execution date and time for the work order can be determined. For example, the scheduled execution date and time may be the same as the target execution date and time and specified to be Sep. 1, 2010, 12:00.

5. Granting Access Right to Worker Entity

It is assumed that a worker B as the worker is assigned the maintenance work. In response to the issuance of the work order for the maintenance work, the asset management system (203) identifies the access right required for the maintenance work and assigns the identified access right to the worker B at a scheduled start time, a predetermined time before (e.g., an hour before) the scheduled start time, or when the worker B reports the start of maintenance work to the asset management system (203). However, when a work order about to start among multiple work orders for the maintenance work which are to be performed in a predetermined sequence is not the first work order in the sequence, the following may take place depending on the necessity to comply with the sequence. Specifically, the status of the prior work order is checked, and if the completion of the prior work order has not been reported, the access right may not be given to the work order that is not the first work order.

6. Starting Maintenance Work

When an IC card is used, the worker B uses the IC card to log into the asset management system (203). The start of the hard disk maintenance work is reported in the following manner which is different depending on the type of the IC card. In a case of a contact type, the IC card is inserted into an IC card reader or an IC card reader/writer. In a case of a non-contact type, the IC card is held over the IC card reader or the IC card reader/writer.

Upon receiving the report indicating the start of the maintenance work, the asset management system (203) issues a token required for replacing the hard disk (ID: AAA) with the hard disk (ID: BBB). The token may include a work order number, a security door number, a default period of validity calculated on the basis of the scheduled work completion time, and a token number, for example. The token is transmitted to the IC card reader/writer in which the IC card of the worker B is inserted or over which the IC card is held. The IC card reader/writer stores the token in a storage medium, e.g., a non-volatile memory, in the IC card.

Upon receiving the report indicating the start of maintenance work, the monitoring system (202) starts performing monitoring for the security of the hard disk (ID: AAA) and the hard disk (ID: BBB). An RFID tag is assumed to be attached to a surface of the each of the hard disk (ID: AAA) and the hard disk (ID: BBB).

The security loading unit (311) of the monitoring system (202) loads from the security policy database (212), security policies for the backup device (ID: 123), the hard disk (ID: BBB), and the hard disk (ID: BBB) and loads from the security policy database (214), a security policy for the work order.

The security policy of the backup device (ID: 123) is as follows: the backup device (ID: 123) must not be moved from a predetermined location.

The security policy of the hard disk (ID: AAA) is as follows: the hard disk (ID: AAA) must not enter a predetermined range from a backup device different from the backup device (ID: 123); the hard disk (ID: AAA) must not stay in a predetermined range (e.g., 1 meter) from the backup device (ID: 123) for more than 5 minutes after being replaced with the hard disk (ID: BBB); and the worker B must not stay in the predetermined range from the backup device (ID: 123) for more than five minutes after replacing the hard disk (ID: AAA) with the hard disk (ID: BBB).

The security policy for the hard disk (ID: BBB) is as follows: a hard disk different from the replacing hard disk (ID: BBB) must not be moved; the hard disk (ID: BBB) must not enter a predetermined range (e.g., one meter) from a backup device different from the backup device (ID: 123); and the worker must not leave the hard disk (ID: BBB) detached from the backup device (ID: 123) for more than five minutes within the predetermined range (e.g., within one meter) from the backup device (ID: 123).

The monitoring information collector (312) of the monitoring system (202) collects data related to locations of the hard disk (ID: AAA), the hard disk (ID: BBB), and the worker from the monitoring units one to n (204 to 206).

The location detector (313) of the monitoring system (202) detects the locations of the hard disk (ID: AAA), the hard disk (ID: BBB), and the worker on the basis of the data related to the locations of the hard disk (ID: AAA), the hard disk (ID: BBB), and the worker from the monitoring units one to n (204 to 206).

The monitoring control/image recognition unit (314) of the monitoring system (202) may make the monitoring video or the monitoring camera shift from the normal monitoring mode to a mode of zooming-in, panning, or viewpoint adjustment to track the worker. The monitoring control/image recognition unit (314) may recognize the face of the worker and detect that he or she is the worker B assigned the work order.

The worker B checks the hard disks as the maintenance subjects and the work order using the asset management system (203).

The worker B logs off from the asset management system (203) after the token is stored in the IC card.

7. Executing Maintenance Work

Using the IC card in which the token is recorded, the worker B accesses the backup device (ID: 123), the hard disk (ID: AAA), the hard disk (BBB), and the locations (e.g., office area and stock room) and executes the assigned work, i.e., replaces the hard disk (ID: AAA) with the hard disk (ID: BBB), on the basis of the work order.

8. Detecting Security Policy Violation

The worker B attempts to take out a hard disk (ID: CCC) instead of the hard disk (ID: BBB) from the stock room. The location detector (313) detects the movement of the hard disk different from the replacing hard disk (ID: BBB). Thus, the security policy "hard disk other than replacing hard disk must not be moved" is violated. Accordingly, the event issuing unit (315) notifies worker B that the hard disk he or she is taking out is not the replacing hard disk by voice.

The worker B moves the hard disk (ID: BBB) from the stock room to the backup device room. The backup device room is assumed to include a backup device (ID: 456) as well as the backup device (ID: 123). The worker B is assumed to carry the hard disk (ID: BBB) as close as 1 m to the backup device (ID: 456) or closer. The location detector (313) detects the movement of the replacing hard disk (ID: BBB) to the backup device (ID: 456) different from the backup device (ID: 123) subjected to the replacement. Thus, the security policy "the hard disk (ID: BBB) must not enter a predetermined area from a backup device other than the backup device (ID: 123)" is violated. Accordingly, the event issuing unit (315) notifies by voice the worker B that it is not the backup device (ID: 123) subjected to the replacement.

The worker B removes the hard disk (ID: AAA) from the backup device (ID: 123) subjected to the replacement and installs the hard disk (ID: BBB). When five minutes passes after the worker B leaves the removed hard disk (ID: AAA) on the backup device (ID: 123), the location detector (313) detects that the hard disk (AAA) stayed on the backup device (ID: 123) for more than 5 minutes. Thus, the security policy "the hard disk (ID: AAA) must not stay in a predetermined range (e.g., one meter) from the backup device (ID: 123) for more than five minutes after being replaced with the hard disk (ID: BBB)" is violated. Accordingly, the event issuing unit (315) notifies the worker B that he or she has left the hard disk (ID: AAA) on the backup device (ID: 123) and transmits the similar message to the work manager.

9. Completing Maintenance Work

The worker B again logs into the asset management system (203) using the IC card upon completing the maintenance work. Then, the worker B reports the completion of work for replacing the hard disk (ID: AAA) with the hard disk (ID: BBB).

In response to the reception of the report indicating the completion of maintenance work from the worker B, the asset management system (203) deletes the token associated with the maintenance work from the IC card.

When reporting the completion of the maintenance work is mandatory for the worker B but no report has been received at the scheduled completion time for the maintenance work, the asset management system (203) detects a work delay as part of work management. Then, the asset management system (203) transmits an alarm message to a predetermined person, e.g., a maintenance manager of the backup device (ID: 123). Whether the access right is to be cancelled due to the work delay depends on the stipulation designated in the work process. For example, the asset management system (203) can perform the following operation in case of a possible maintenance work delay. Specifically, the asset management system (203) repeatedly transmits the alarm message to the maintenance manager for a predetermined period, e.g., for an hour, without cancelling the access right. Alternatively, when the scheduled work completion time has been set in consideration of a delay time, the asset management system (203) cancels the access right immediately and transmits the alarm message to a security staff in charge of the office area in which the backup device (ID: 123) is provided.

Meanwhile, suppose a case where the token is recorded in the IC card of the worker B but the security doors for accessing the hard disk are not connected online to the asset management system (203). In this case, unless the worker B again logs into the backup device (ID: 123) and reports the work delay, the access rights to the security doors expire after the period of validity included in the token. On the other hand, if the worker B again logs into the backup device (ID: 123) and reports the work delay, the work delay report also serves as application for access right extension, and thus may prevent the access right from expiring after the period of validity included in the token and may extend the period of validity for a predetermined time period, e.g., an hour.

When reporting the completion of the maintenance work is not mandatory, the backup device (ID: 123) may cancel the access right at the scheduled work completion time for the maintenance work. The backup device (ID: 123) may also set the period of validity in the token at the scheduled work completion time.

What is claimed is:

1. A method of processing by a computer to manage an access right to at least one asset associated with at least one digital work order, the method comprising steps executed by the computer of:
    at a scheduled start time for the at least one digital work order to be executed, or in response to reception of a report indicating a start of work for the at least one digital work order or a report indicating a completion of work for a preceding work order to the at least one digital work order:
        loading into a memory of the computer a security policy associated with the at least one digital work order, or an asset associated with the at least one digital work order, wherein the asset is a non-human hardware-based asset coupled to a network, and
        starting to monitor a location of the asset associated with the at least one digital work order;
    generating an event for managing the asset in response to a fact that the loaded security policy is violated by the location of the asset associated with the at least one digital work order, or a change in the location of the asset associated with the at least one digital work order that was obtained by the monitoring, wherein the event for managing the asset changes depending on a level or a type of the security policy violation; and
    in response to the generating of the event, monitoring the asset violating the security policy by a monitor zooming-in, panning, or viewpoint adjustment on the asset associated with the at least one digital work order.

2. The method according to claim 1, wherein the event for managing the asset is generated by accessing an event database comprising a plurality of security policy violations each having a respective associated event, wherein the plurality of security policy violations include a limitation on moveable distance of the asset from the location and unauthorized entrance to the location of the asset, and further comprising a step executed by the computer of, in response to the generation of the event, cancelling or invalidating an access right to at least one access control device associated with an access to the asset associated with the at least one digital work order already started.

3. A method of processing by a computer to manage an access right to at least one asset associated with at least one digital work order, the method comprising steps executed by the computer of:
    at a scheduled start time for the at least one digital work order to be executed, or in response to reception of a report indicating a start of work for the at least one digital work order or a report indicating a completion of work for a preceding work order to the at least one digital work order:
        loading into a memory of the computer a security policy associated with the at least one digital work order, or an asset associated with the at least one digital work order, wherein the asset is a non-human hardware-based asset coupled to a network, and starting to monitor a location of the asset associated with the at least one digital work order;

generating an event for managing the asset in response to a fact that the loaded security policy is violated by the location of the asset associated with the at least one digital work order, or a change in the location of the asset associated with the at least one digital work order that was obtained by the monitoring, wherein the event for managing the asset changes depending on a level or a type of the security policy violation; and stopping or interrupting the monitoring at a scheduled completion time for the at least one digital work order, or in response to reception of a report indicating the completion of work for the at least one digital work order or a report indicating the start of work for a succeeding work order to the at least one digital work order already started.

4. The method according to claim 1, further comprising:

receiving the at least one digital work order from an asset management system coupled to the asset via the network; and transmitting the event for managing the asset to the asset management system using the network in order to manage an access right of the asset.

5. The method according to claim 1, wherein the event also changes depending on the at least one digital work order or the asset.

6. The method according to claim 1, wherein the event notifies a work manager of the security policy violation and includes evidence of the security violation with recorded content before the security violation occurred having been removed.

7. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order, or an asset associated with the at least one digital work order, wherein the asset is a non-human hardware-based asset coupled to a network, and starting to monitor a location of the asset associated with the at least one digital work order;

generating an event for managing the asset in response to a fact that the loaded security policy is violated by the location of the asset associated with the at least one digital work order, or a change in the location of the asset associated with the at least one digital work order that was obtained by the monitoring; and applying, responsive to a change in the security policy associated with the at least one digital work order, a worker entity security policy associated with the worker entity designated in the at least one digital work order, wherein the worker entity security policy is associated with the at least one digital work order and specifies worker accessibility to the asset when performing work specified in the at least one digital work order.

8. The method according to claim 1, wherein the location is monitored: by a radio device, a cell phone, an RFID, or a GPS attached to the asset; by image recognition using a monitoring video or a monitoring camera; or by ultra sonic wave detection, infrared detection, or electrical field detection.

9. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order, or an asset associated with the at least one digital work order, wherein the asset is a non-human hardware-based asset coupled to a network, and starting to monitor a location of the asset associated with the at least one digital work order; and generating an event for managing the asset in response to a fact that the loaded security policy is violated by the location of the asset associated with the at least one digital work order, or a change in the location of the asset associated with the at least one digital work order that was obtained by the monitoring, wherein:

the computer includes a configuration management system and a configuration management database;

the asset is a configuration item maintained in the configuration management database; and the at least one digital work order is issued by a change management process or a release management process of the configuration management system.

10. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order or an asset associated with the at least one digital work order, wherein the asset is a non-human hardware-based asset, and starting to monitor a location of a moving object present around the asset; and generating an event for managing the moving object in response to a fact that the loaded security policy is violated by an elapsed time at the location of the moving object that was obtained by the monitoring, wherein the event for managing the asset changes depending on a level or a type of the security policy violation; and in response to the generation of the event, locking an access control device associated with an access to the asset associated with the at least one digital work order already started.

11. The method according to claim 10, wherein the event for managing the asset is generated by accessing an event database comprising a plurality of security policy violations each having a respective associated event, wherein the plurality of security policy violations include a time period during which the moving object can stay at the location of the moving object, and further comprising a step executed by the computer of, in response to the generation of the event, cancelling or invalidating an access right to at least one access control device associated with an access to the asset associated with the at least one digital work order already started.

12. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order or an asset associated with the at least one digital work order, wherein the asset is a non-human hardware-based asset, and starting to monitor a location of a moving object present around the asset;

generating an event for managing the moving object in response to a fact that the loaded security policy is violated by an elapsed time at the location of the moving object that was obtained by the monitoring, wherein the event for managing the asset changes depending on a level or a type of the security policy violation; and in response to the generating of the event, monitoring the moving object violating the security policy by a monitor zooming-in, panning, or viewpoint adjustment on the moving object.

13. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order or an asset associated with the at least one digital work order, wherein the asset is a non-human hardware-based asset, and starting to monitor a location of a moving object present around the asset;

generating an event for managing the moving object in response to a fact that the loaded security policy is violated by an elapsed time at the location of the moving object that was obtained by the monitoring, wherein the event for managing the asset changes depending on a level or a type of the security policy violation; and stopping or interrupting the monitoring at a scheduled completion time for the at least one digital work order, or in response to reception of a report indicating the completion of work for the at least one digital work order or a report indicating the start of work for a succeeding work order to the at least one digital work order already started.

14. The method according to claim 10, further comprising:

receiving the at least one digital work order from an asset management system coupled to the asset via the network; and transmitting the event for managing the asset to the asset management system using the network in order to manage an access right of the asset.

15. The method according to claim 10, wherein the event also changes depending on the at least one digital work order, the asset, or the moving object.

16. The method according to claim 10, wherein the event notifies a work manager of the security policy violation and includes evidence of the security violation with recorded content before the security violation occurred having been removed.

17. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order or an asset associated with the at least one digital work order, wherein the asset is a non-human hardware-based asset, and starting to monitor a location of a moving object present around the asset;

generating an event for managing the moving object in response to a fact that the loaded security policy is violated by an elapsed time at the location of the moving object that was obtained by the monitoring; and applying, responsive to a change in the security policy associated with the at least one digital work order, a worker entity security policy associated with the worker entity designated in the at least one digital work order, wherein the worker entity security policy is associated with the at least one digital work order and specifies worker accessibility to the asset when performing work specified in the at least one digital work order.

18. The method according to claim 10, wherein the location is monitored: by a radio device, a cell phone, an RFID, or a GPS attached to the asset or the moving object; by image recognition using a monitoring video or a monitoring camera; or by ultra sonic wave detection, infrared detection, or electrical field detection.

19. A method of processing by a computer to manage an access right to at least one asset associated with at least one digital work order, the method comprising steps executed by the computer of:

at a scheduled start time for the at least one digital work order to be executed, or in response to reception of a report indicating a start of work for the at least one digital work order or a report indicating a completion of work for a preceding work order to the at least one digital work order:

loading into a memory of the computer a security policy associated with the at least one digital work order or an asset associated with the at least one digital work order, wherein the asset is a non-human hardware-based asset, and starting to monitor a location of a moving object present around the asset; and generating an event for managing the moving object in response to a fact that the loaded security policy is violated by an elapsed time at the location of the moving object that was obtained by the monitoring; wherein:

the computer includes a configuration management system and a configuration management database;

the asset is a configuration item maintained in the configuration management database; and the at least one digital work order is issued by a change management process or a release management process of the configuration management system.

\* \* \* \* \*